US008913994B2

(12) United States Patent
Edwards et al.

(10) Patent No.: US 8,913,994 B2
(45) Date of Patent: Dec. 16, 2014

(54) SYSTEM AND METHOD FOR CALL BLOCKING AND SMS BLOCKING

(71) Applicant: Lookout, Inc., San Francisco, CA (US)

(72) Inventors: Stephen J. Edwards, San Francisco, CA (US); Ankur Bharatbhushan Nandwani, San Francisco, CA (US); Rohan Nagarakere Ramakrishna, Waterloo (CA); Brian James Buck, Livermore, CA (US); Kesava Abhinav Yerra, San Francisco, CA (US)

(73) Assignee: Lookout, Inc., San Francisco, CA (US)

( * ) Notice: Subject to any disclaimer, the term of this patent is extended or adjusted under 35 U.S.C. 154(b) by 64 days.

(21) Appl. No.: 13/693,877

(22) Filed: Dec. 4, 2012

(65) Prior Publication Data

US 2014/0128047 A1    May 8, 2014

Related U.S. Application Data

(60) Provisional application No. 61/722,003, filed on Nov. 2, 2012.

(51) Int. Cl.
| | |
|---|---|
| *H04M 1/66* | (2006.01) |
| *H04W 4/16* | (2009.01) |
| *H04W 12/06* | (2009.01) |
| *H04M 3/436* | (2006.01) |
| *H04L 12/58* | (2006.01) |
| *H04M 3/42* | (2006.01) |
| *H04L 29/06* | (2006.01) |

(52) U.S. Cl.
CPC ............... *H04W 4/16* (2013.01); *H04W 12/06* (2013.01); *H04M 3/436* (2013.01); *H04L 51/12* (2013.01); *H04M 3/42042* (2013.01); *H04L 63/08* (2013.01); *H04M 3/42068* (2013.01); *H04L 51/28* (2013.01)

USPC ........ 455/411; 455/410; 455/414.1; 455/415; 455/518; 455/519

(58) Field of Classification Search
CPC ... H04W 4/16; H04W 12/06; H04M 3/42042; H04L 63/08
USPC .............. 455/411, 410, 415, 414.1, 517, 518, 455/519, 550.1, 556.2
See application file for complete search history.

(56) References Cited

U.S. PATENT DOCUMENTS

| | | | |
|---|---|---|---|
| 6,941,134 B2 * | 9/2005 | White | 455/418 |
| 8,126,456 B2 | 2/2012 | Lotter et al. | |

(Continued)

OTHER PUBLICATIONS aFirewall call and sms blocker—Android Apps on Google Play, https://play.google.com/store/apps/details?id=com.lianyun. afirewall.inapp&feature=search_result, Retrieved Nov. 6, 2012, p. 1-6.

(Continued)

*Primary Examiner* — Khai M Nguyen
(74) *Attorney, Agent, or Firm* — Dergosits & Noah LLP

(57) ABSTRACT

Systems and techniques are provided for managing and categorizing undesired phone calls and text messages. In a specific implementation, an electronic communication identified by a phone number is intercepted at a mobile communications device before the electronic communication is received by an application program on the device. The phone number is sent to a server for the server to identify a category associated with the phone number. The category is received at the mobile communication device. Based on the received category, a determination is made as to whether the application program should be allowed to receive the electronic communication. If allowed, the electronic communication is forwarded to the application program; else, the electronic communication is not forwarded.

13 Claims, 14 Drawing Sheets

(56) References Cited

U.S. PATENT DOCUMENTS

| | | | | |
|---|---|---|---|---|
| 8,355,491 | B1* | 1/2013 | Butt | 379/210.02 |
| 8,655,307 | B1* | 2/2014 | Walker et al. | 455/405 |
| 2010/0197275 | A1* | 8/2010 | Yamasaki | 455/411 |
| 2011/0026702 | A1* | 2/2011 | Bot | 379/210.02 |
| 2011/0103586 | A1* | 5/2011 | Nobre | 380/270 |
| 2011/0128906 | A1* | 6/2011 | Arrasvuori et al. | 370/328 |
| 2012/0051529 | A1* | 3/2012 | Dobbins et al. | 379/142.06 |
| 2012/0309365 | A1* | 12/2012 | Wang et al. | 455/414.1 |
| 2013/0263248 | A1* | 10/2013 | Zhu et al. | 726/13 |
| 2014/0074824 | A1* | 3/2014 | Rad et al. | 707/722 |

OTHER PUBLICATIONS

Call Blocker-Android Apps on Google Play, https://play.google.com/store/apps/details?id=com.netqin.mm#?t=W251bGwsMSwxLDIxMiwiY29tLm5IdT%E2%80%A6, Retrieved Nov. 6, 2012, p. 1-6.

call+sms Blocker—Award Winner—Android Apps on Google Play, https://play.google.com/store/apps/details?id=com.smsBlocker&feature=search_result, Retrieved Nov. 6, 2012, p. 1-9.

Calls Blacklist—Android Apps on Google Play, https://play.google.com/store/apps/details?id=com.vladlee.easyblacklist&feature=search_result, Retrieved Nov. 6, 2012, p. 1-6.

Handcent SMS—Android Apps on Google Play, https://play.google.com/store/apps/details?id=com.handcent.nextsms&feature=search_result, Retrieved Nov. 6, 2012, p. 1-9.

Mr. Number-Block calls, texts—Android Apps on Google Play, https://play.google.com/store/apps/details?id=com.mrnumber.blocker&feature=search_result, Retrieved Nov. 6, 2012, p. 1-6.

Postman: SMS Spam Blocker—Android Apps on Google Play, https://play.google.com/store/apps/details?id=com.thesimpleandroidguy.apps.messageclient&feature=s%E2%80%A6, Retrieved Nov. 6, 2012, p. 1-4.

SMS and Call Blocker Plugin—Android Apps on Google Play, https://play.google.com/store/apps/details?id=com.smartanuj.sms&feature=search_result, Retrieved Nov. 6, 2012, p. 1-4.

WhosCall-block calls, texts—Android Apps on Google Play, https://play.google.com/store/apps/details?id=gogolook.callgogolook2&feature=search_result, Retrieved Nov. 6, 2012, p. 1-9.

* cited by examiner

| Msg Id | Sender | Body | Status |
|---|---|---|---|
| 1 | (555) 867-5309 | Congratulations! You just won . . . | Received |
| ⋮ | ⋮ | ⋮ | ⋮ |
| ⋮ | ⋮ | ⋮ | ⋮ |
| ⋮ | ⋮ | ⋮ | ⋮ |

605 ← 610 (Msg Id), 615 (Sender), 620 (Body), 625 (Status)

FIG. 6

| Msg Id | Type | Sender | Body | Status | Recipient |
|---|---|---|---|---|---|
| 1 | Inbound | (555) 867-5309 | Congratulations! You just won . . . | Received | - |
| 2 | Outbound | (555) 415-7702 | Forwarding Message from (555) 867-5309: Congratulations! You just won . . . | Draft | (415) 555-SPAM |

1005 → (row 1)
1015 → (row 2)

FIG. 10

SYSTEM AND METHOD FOR CALL BLOCKING AND SMS BLOCKING

CROSS-REFERENCE TO RELATED APPLICATIONS

This patent application claims priority to U.S. provisional patent application 61/722,003, filed Nov. 2, 2012, which is incorporated by reference along with all other references cited in this application.

BACKGROUND

Mobile communication devices such as smartphones let people easily connect with family, friends, business acquaintances, and many others. People use their smartphones to receive calls, make calls, receive text messages, and send text messages. Exchanging calls and messages help people coordinate with others, manage appointments, manage schedules, receive important updates, and much more.

However, few things are more annoying than receiving unsolicited calls and text messages. Such communications can involve offers to sell extended warranties, promotions for reduced mortgage rates, lower credit card rates, marketing surveys, time-share sales, political advertisements, and other promotions. In some cases, the callers or message senders may attempt to deceive consumers into buying the offered products and services. For example, a caller may falsely give the impression a warranty is about to expire, announce that the person has won a prize, but must first pay a processing fee in order to claim the prize, falsely accuse the person of being delinquent on a payment—just to name a few examples.

The calls and messages may be received at inconvenient times such as during dinner or early morning hours. Further, users are often charged for the receipt of these unwanted communications. For example, the user's wireless carrier may charge the user for the receipt of a text message— regardless of whether or not the text message was an unsolicited advertisement. Calls that are answered may be added to the user's monthly calling minutes. Thus, there is a need to develop systems and techniques to block or allow certain categories of calls and messages.

BRIEF SUMMARY OF THE INVENTION

Systems and techniques are provided for managing and categorizing undesired phone calls and text messages. In a specific implementation, an electronic communication identified by a phone number is intercepted at a mobile communications device before the electronic communication is received by an application program on the device. The phone number is sent to a server for the server to identify a category associated with the phone number. The category is received at the mobile communication device. Based on the received category, a determination is made as to whether the application program should be allowed to receive the electronic communication. If allowed, the electronic communication is forwarded to the application program; else, the electronic communication is not forwarded. The electronic communication may include a voice call, a short message service (SMS) message, or a multimedia message service (MMS) message.

Determining whether the application program should be allowed to receive the electronic communication may include comparing the received category to a list of categories stored on the mobile communications device, if the list includes the received category, determining that the application program should not be allowed to receive the electronic communication, and if the list does not include the received category, determining that the application program should be allowed to receive the electronic communication.

Alternatively, determining whether the application program should be allowed to receive the electronic communication may include comparing the received category to a list of categories stored on the mobile communications device, if the list includes the received category, determining that the application program should be allowed to receive the electronic communication, and if the list does not include the received category, determining that the application program should not be allowed to receive the electronic communication.

In another specific implementation, a method includes intercepting, at a mobile communications device, an electronic communication including an identifier before the electronic communication is received by an application program on the mobile communications device, sending the identifier to a server for the server to provide information associated with the identifier, receiving the information associated with the identifier from the server, evaluating at least one rule using the received information to determine whether the application program should be allowed to receive the electronic communication, if allowed, forwarding the electronic communication to the application program, and if not allowed, blocking the application program from receiving the electronic communication.

Evaluating at least one rule may include evaluating a first rule, and evaluating a second rule, where the second rule specifies an exception to the first rule.

In a specific implementation, the method further includes the information associated with the identifier including a category and a name, and the step of evaluating at least one rule includes evaluating a first rule, and evaluating a second rule, where the first rule specifies that electronic communications associated with the category should be blocked, and the second rule specifies the name as an exception to the first rule.

In another specific implementation, the information associated with the identifier includes a category, and the step of evaluating at least one rule includes evaluating a rule that specifies electronic communications belonging to the category are to be blocked when the electronic communications are received at the mobile communications device while the mobile communications device is in a specific location.

In another specific implementation, the information associated with the identifier includes a category, and the step of evaluating at least one rule includes evaluating a rule that specifies electronic communications belonging to the category are to be blocked when the electronic communications are received at the mobile communications device during a specific time period.

In another specific implementation, the information associated with the identifier includes a category, and the step of evaluating at least one rule includes evaluating a rule that specifies electronic communications belonging to the category are to be blocked when a charge level of a battery of the mobile communications device is below a threshold charge level.

In another specific implementation, the information associated with the identifier includes a category, and the step of evaluating at least one rule includes evaluating a rule that specifies electronic communications belonging to the category are to be blocked when a monthly communications usage total is above a threshold value.

In another specific implementation, a method includes receiving from a crowd information indicating that an electronic communication received at a mobile communications device of each user in the crowd should belong in a specific category, if a number of users in the crowd exceeds a threshold value, storing in a database information identifying the electronic communication as belonging in the specific category, and providing the database to a mobile communications device of a user, where when the electronic communication is transmitted to the mobile communications device of the user, the electronic communication is blocked at the mobile communications device of the user because the electronic communication is in the specific category. The user may or may not be in the crowd. The electronic communication may include a voice call, a short message service (SMS) message, or a multimedia message service (MMS) message.

In a specific implementation, the electronic communication is blocked by a blocking application program at the mobile communications device of the user, and the blocking application program is different from a short message service (SMS) or multimedia message service (MMS) application program at the mobile communications device of the user.

In a specific implementation, the electronic communication is blocked by a blocking application program at the mobile communications device of the user, and the blocking application program is different from a phone dialer application program at the mobile communications device of the user.

BRIEF DESCRIPTION OF THE DRAWINGS

The present invention is illustrated by way of example and not limitation in the figures of the accompanying drawings, in which like references indicate similar elements, and in which:

FIG. 6 shows an example of data that may be stored in a Comm Database.

FIG. 10 shows another example of data that may be stored in the Comm Database.

DETAILED DESCRIPTION

Figure 1:
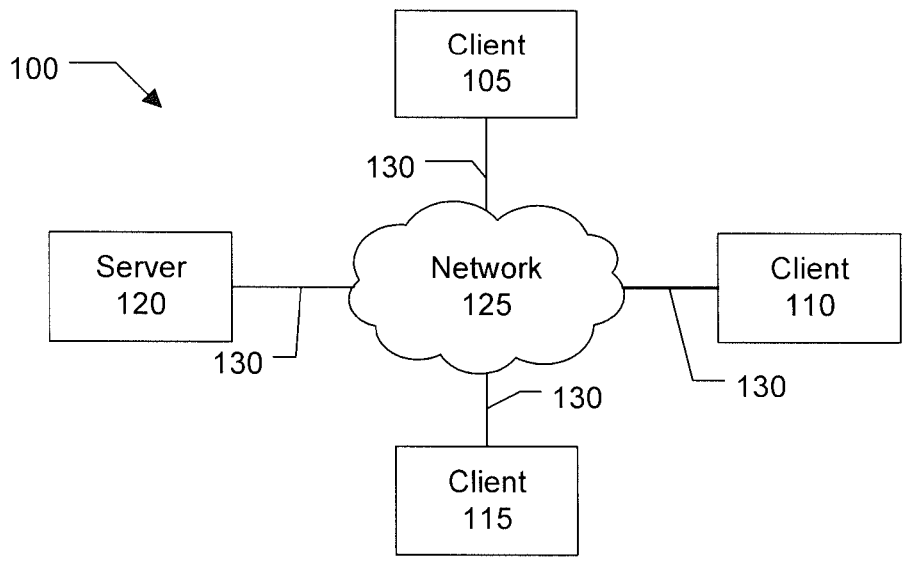
FIG. 1 shows a simplified block diagram of a distributed computing network connecting a server and clients in which a system and method for call and message blocking may be implemented.

FIG. 1 is a simplified block diagram of a distributed computer network 100 incorporating a specific embodiment of a system for call and message blocking. Computer network 100 includes a number of client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 125 is the Internet, in other embodiments, communication network 125 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system.

Client systems 105, 110, and 115 typically request information from a server system which provides the information. Server systems by definition typically have more computing and storage capacity than client systems. However, a particular computer system may act as both a client or a server depending on whether the computer system is requesting or providing information. Aspects of the system may be embodied using a client-server environment or a cloud-cloud computing environment.

Server 120 is responsible for receiving information requests from client systems 105, 110, and 115, performing processing required to satisfy the requests, and for forwarding the results corresponding to the requests back to the requesting client system. The processing required to satisfy the request may be performed by server system 120 or may alternatively be delegated to other servers connected to communication network 125.

Client systems 105, 110, and 115 enable users to access and query information or applications stored by server system 120. Some example client systems include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™ Android™ OS, Google Chrome OS, Symbian OS®, Windows Mobile® OS, Windows Phone, BlackBerry OS, Embedded Linux, webOS, Palm OS® or Palm Web OS™.

In a specific embodiment, a "web browser" application executing on a client system enables users to select, access, retrieve, or query information and/or applications stored by server system 120. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

Figure 2:
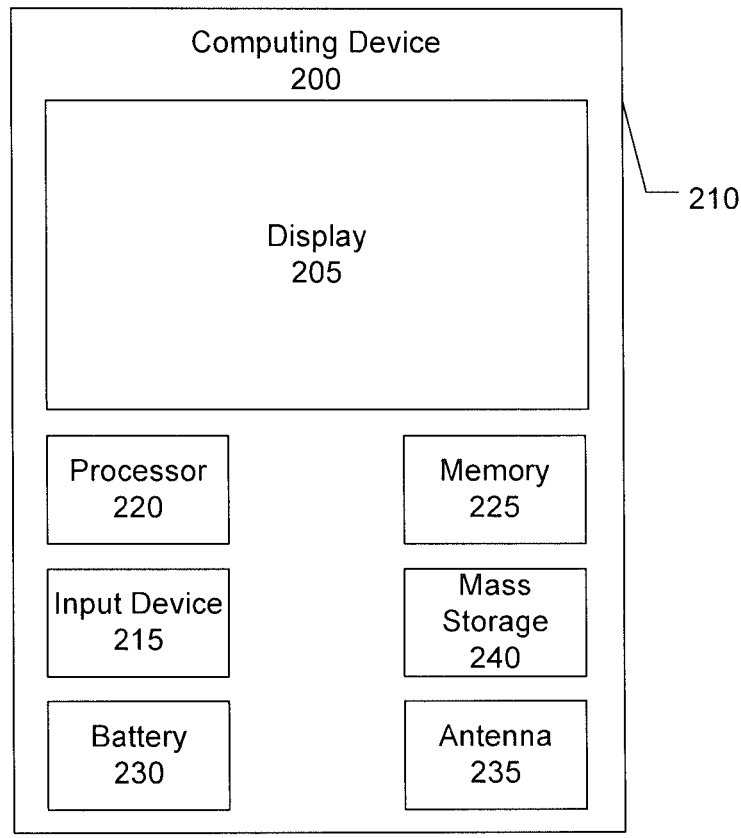
FIG. 2 shows a more detailed diagram of an exemplary client.

FIG. 2 shows an exemplary computer system such as a client system. In an embodiment, a user interfaces with the system through a client system, such as shown in FIG. 2. Mobile client communication or portable electronic device 200 includes a display, screen, or monitor 205, housing 210, and input device 215. Housing 210 houses familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The system may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use. Other configurations of subsystems suitable for use will be readily apparent to one of ordinary skill in the art. For example, in a specific implementation, the computing device is mobile communication device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the systems and techniques described in this application may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the techniques described in this application may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the techniques described in this application may be transmitted via wires, radio waves, or through a network such as the Internet. In another specific embodiment, a computer program product including a variety of software program code to implement features described in this application is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Windows Phone, Symbian, BlackBerry OS, Palm web OS, bada, Embedded Linux, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows 8, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the systems and methods in this application using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 3:
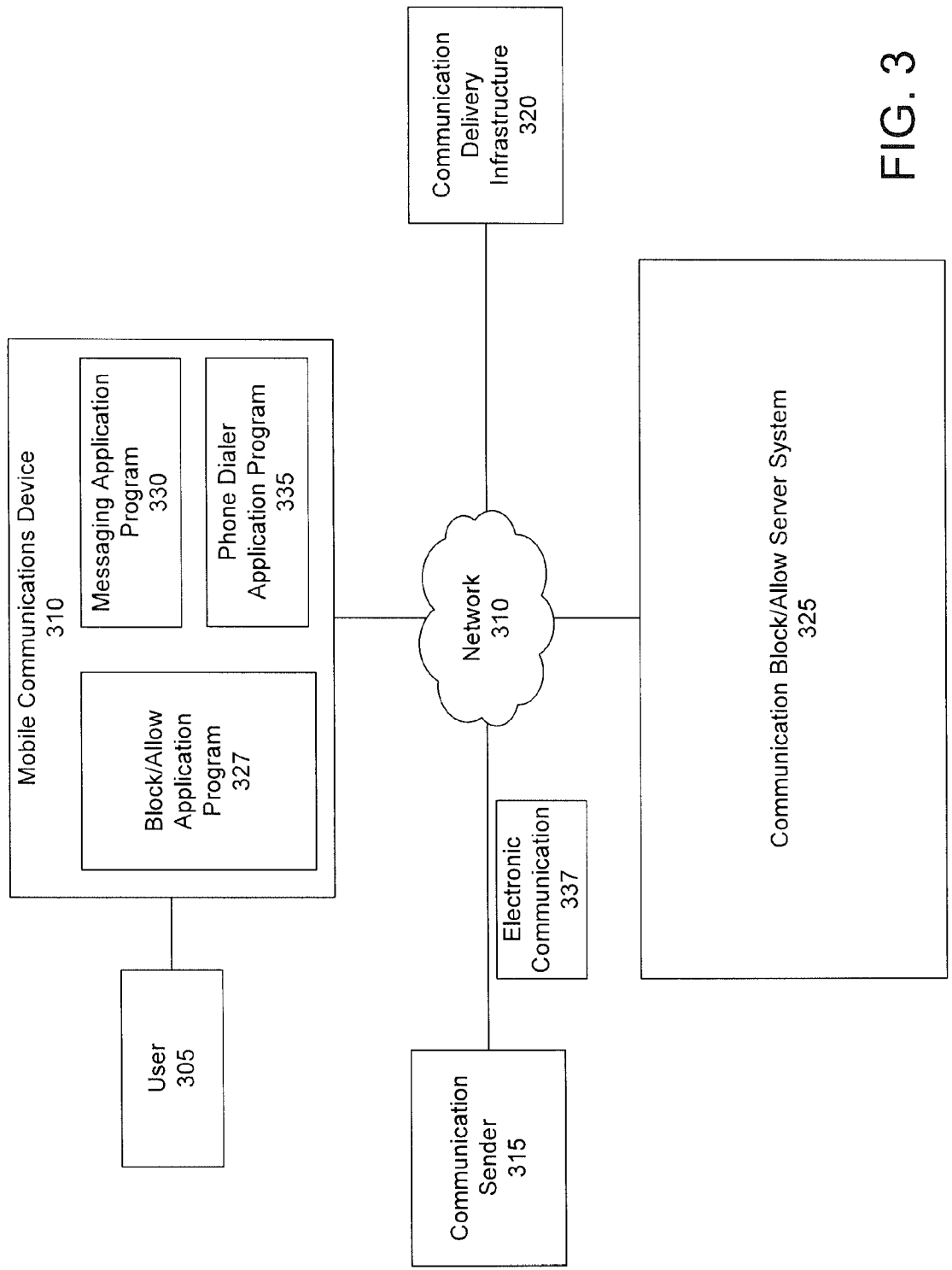
FIG. 3 shows a block diagram of an environment for delivering voice and messages in a system having a call and message blocking service.

FIG. 3 shows a simplified block diagram of an environment in which a system for blocking and allowing electronic communications, such as calls and messages, may be implemented. In the environment shown in FIG. 3 there is a user 305 at a mobile communications device 310. The mobile communications device is connected via a network 310 to a communication sender 315, a communication delivery infrastructure 320, and a communications block/allow server system 325. The mobile communications device includes a communications block/allow application program 327 which may be referred to as a blocking program. The network is as shown in FIG. 1 and described above.

In a specific implementation, the system provides users a mechanism for selectively allowing or blocking voice calls or SMS text messages, based on the user's current preferences. Criteria can include lists of phone numbers to be allowed or blocked, where such lists are created by the user, are crowd-sourced, have other origins, or combinations of these. Criteria can include user preferences based on a variety of labels or categories associated with phone numbers, said labels or categories to come from user input, external information sources/services, or combinations of these. Criteria can include filters on the registered name for the phone number. Criteria can include time of day or day of week. Criteria can include the current location of the user, the registered location of the calling phone number, or both. Criteria can include the existence of contemporaneous events (such as meetings). Criteria can include other conditional items, such as the current state of the mobile device battery.

Calls or messages can be blocked on the device, or upstream in the calling network at a server or other piece of calling network infrastructure.

Documentation regarding calls or messages from phone numbers that may be violating do not call registry requirements or other legal provisions regarding unsolicited communication can be collected. In a specific implementation, techniques are provided for intercepting calls or messages, using existing app user interfaces. For example, in an implementation, users can continue to use their existing text messaging and phone dialer application programs. This helps to improve the user experience because users will not have to relearn a new text messaging or phone dialer application.

These features may be a stand-alone product or may be integrated with another product. In a specific implementation, one or more of these features are part of a product referred to as Lookout Mobile Security (LMS) Premium by Lookout of San Francisco, Calif. Lookout is a smartphone security company that provides products and services to protect users from viruses, malware, and spyware, backup and restore data, and to locate lost or stolen phones. Lookout has millions of users across 400 mobile networks in 170 countries and counting. In another specific implementation, the parts that relate to blocking/allowing in the calling network infrastructure are applicable to products that involve carrier preload.

In the example shown in FIG. 3, mobile communications device 310 is a portable electronic device such as a smartphone or tablet computer. The device may include hardware and software such as described above. For example, a mobile communications device may include a an electronic display to show data and receive input (e.g., touchscreen), processor, memory, storage, mobile application programs (or apps) such as a text messaging application program 330, a phone dialer application program 335, a browser application program, or combinations of these. The mobile communication device can execute executable code (or computer-readable code) that embodies a technique or algorithm as described in this patent application.

Communication sender 315 is another user, organization, company, or entity that sends an electronic communication 337 to user 305. Communications delivery infrastructure 320 includes the communication network and associated components that are responsible for delivering the electronic communication to the user. For example, the infrastructure may include a wireless carrier (also known as a mobile network operator, wireless service provider, wireless carrier, cellular company, or mobile network carrier). The wireless carrier is a provider of wireless communication services that owns or controls the elements necessary to deliver the electronic communication to the user. This may include, for example, cell towers, phone switches, servers inside the carrier's infrastructure; for calls (VoIP) or SMS text messages (being distributed, e.g., in bulk, over an IP network) at a switch, router, firewall, SMS gateway, or the like. Typically, the wireless carrier owns or controls access to a radio spectrum license from a regulatory or government entity.

Some examples of electronic communications 337 include text messages (e.g., short message service (SMS) messages, or multimedia message service (MMS) messages), or voice calls. In a specific implementation, the electronic communication does not include email, i.e., excludes email. Typically, a text message is a brief electronic message (e.g., 160 characters or less) that may be sent over a phone network to a mobile communication device from another portable or fixed device. The 160-character limitation results from the system on which SMS operates. Instead of using the primary system for telephone communication, SMS uses a channel designed to send small packets of information between cell phones and cell towers. The 160-character SMS limit is simply a consequence of the originally modest use to which this channel was put. The channel was chosen as the basis for SMS because the system could be implemented easily, with minimal need for new infrastructure.

More specifically, text messages are delivered through a wireless carrier. Text messages can be sent from one phone number to another phone number. Text messages are considered to be different from email. For example, email is delivered through the internet and sent to an email address. Users may be charged minutes or credits for sending text messages, receiving text messages, or both. The content of a message may include text, image, video, sound, or combinations of these. Text messages can be used to interact with automated systems such as ordering products and services for mobile phones or participating in contests. Advertisers and service providers sometimes use direct text marketing to notify mobile phone users about promotions, payment due dates and other notifications.

A voice call or telephone call may carry ordinary voice transmission using a telephone, data transmission when the calling party and called party are using modems, or facsimile transmission when they are using fax machines. The call may use land line, mobile phone, satellite phone, or combinations of these. Calls may be placed through a public network (such as the Public Switched Telephone Network) provided by a commercial telephone company or a private network called a PBX.

A phone call may be associated with various tones preceding, during, and after a traditional telephone call is placed. Certain tones signify the progress and status of the telephone call. For example, in the case of a call from a landline, there may be a dial tone signifying that the communication delivery infrastructure is ready to accept a telephone number and connect the call; a ringing tone signifying that the calling party has yet to answer the telephone; a busy signal (or engaged tone) signifying that the calling party's telephone is being used in a telephone call to another person; a fast busy signal (also called reorder tone or overflow busy tone) signifying that there is congestion in the telephone network, or possibly that the calling subscriber has delayed too long in dialing all the necessary digits. The fast busy signal is generally twice as fast as the normal busy signal.

Server system 325 includes general hardware and software components similar to that described above. For example, the server system may include a server having a processor, memory, applications, and storage.

In a specific implementation, blocking program 327 is a mobile application program. Mobile application programs are software applications designed to run on smartphone, tablet computers, and other mobile devices. The program may be available through a mobile application distribution platform such as the Apple App Store, Google Play, Amazon Appstore, Windows Phone Store and BlackBerry App World.

In another specific implementation, the program may be preloaded onto a mobile device by the carrier. That is, the program may be installed on the device before the device is purchased by a user. This implementation may be referred to as carrier preload. Carrier preload can enable special privileges for the blocking application program, up to and including root level access on the device, allowing it to perform operations that would not otherwise be available.

In a specific implementation, the blocking program is responsible for regulating or filtering incoming voice calls, text messages, or both sent from the communication sender. The blocking program can intercept an incoming communication, such as an incoming text message, before the text message is received by messaging application 330. The blocking program can determine whether the message is undesirable (e.g., spam). If the message is undesirable the blocking program will not forward the message to the messaging application program thereby blocking the message from being received by the messaging application program.

Likewise, the blocking program can intercept an incoming voice call before the call is received by phone dialer application program 335. If the call is undesirable the blocking program will not forward the call to the phone dialer program. In a specific implementation, the blocking program works with server system 325 to make the determination. Servers typically have more computing resources than the mobile communications devices. For example, as compared to a mobile communication device, a server may have more memory, storage, and a faster processor. Further, unlike a mobile communications device, servers typically do not rely on a battery as a primary source of power. Thus, one advantage of using the server system to help make decisions is that processor intensive computing tasks such as those involving large datasets and complex algorithms can be performed on a server. The results of the server computations can be transmitted as instructions for the mobile device to follow and execute.

Generally, users on mobile communications devices can receive inbound voice calls and SMS text messages that are not desired (spam, phishing, or other undesirable communications). Users do not have a means that is convenient and cost effective to selectively block or allow such communications. Additionally, there is no effective way to block certain kinds of outgoing voice calls or SMS text messaging.

More particularly, mobile phone spam is a form of spamming directed at the text messaging service of a mobile phone. It is described as mobile spamming, SMS spam, text spam, m-spam or mspam. Spam often includes unsolicited (and generally unwanted) commercial advertisements being sent to the mobile device through text messaging. This can be particularly annoying for the recipient because, unlike in email, some recipients may be charged a fee for every message received, including spam.

Spam can include unwanted voice calls. For example, telemarketing is a type of direct marketing in which a salesperson solicits prospective customers to buy products or services over the phone. A telemarketing call may involve a live operator or a prerecorded message (e.g., automated telemarketing or robocalling). Calls from telemarketers can be particularly annoying when they occur during the dinner hour, early in the morning, or late in the evening. In some cases, telemarketing is performed to facilitate scams and frauds such as pyramid schemes or deceptively overpriced products and services.

The blocking program helps to block these unwanted communications. A blocking operation may occur at the mobile communications device or "upstream" in the calling network.

Figure 4:
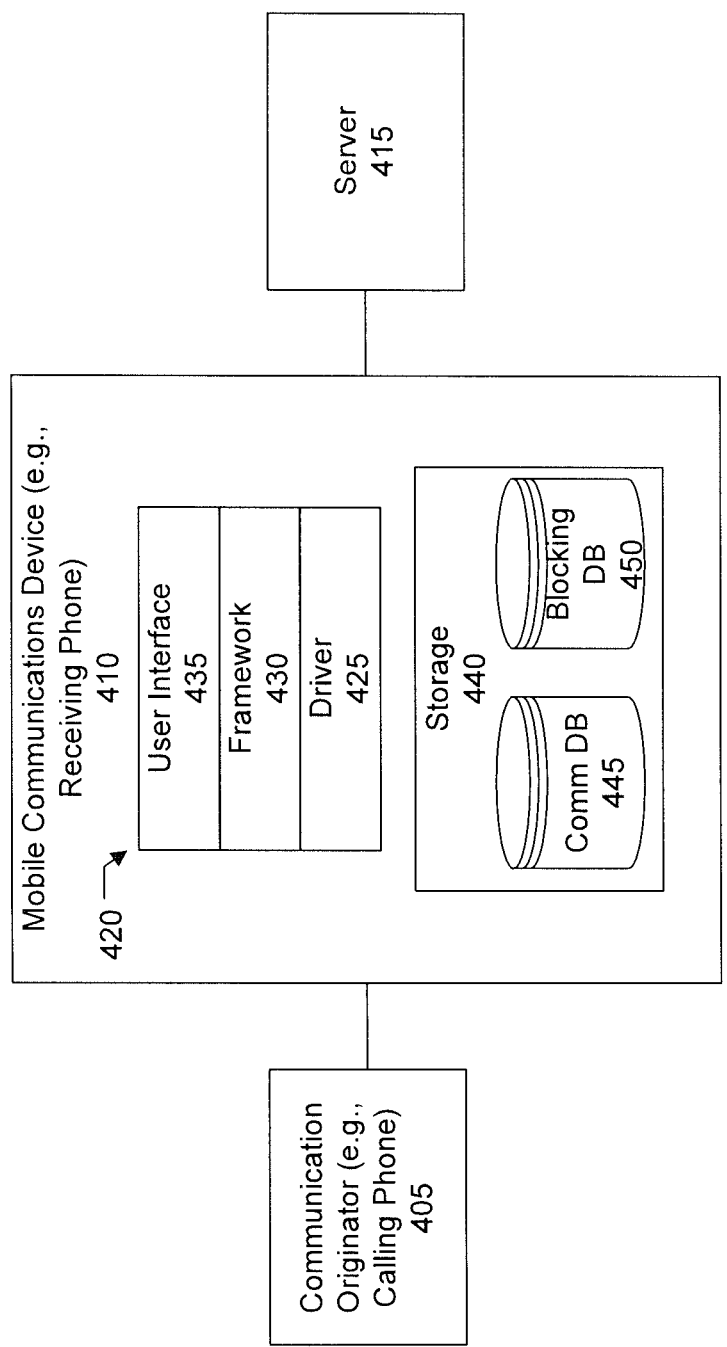
FIG. 4 shows a block diagram of a mobile communications device receiving a call or message.

FIG. 4 shows a block diagram of a specific implementation of a system for blocking unwanted communications. As shown in FIG. 4, there is a communication originator or sender 405, a mobile communications device 410, and a server 415. The sender may be referred to as the calling phone. The mobile communications device may be referred to as the receiving phone. In a specific implementation, the mobile communications device includes an Android operating system 420 as provided by Google. At the low level there is a driver 425, above it the framework (FM) 430, and above that the user interface 435 (UI), e.g., the UI for the phone/calling app, or the UI for the SMS text receiving/sending app.

The mobile communications device includes storage 440 including databases 445 and 450. Database 445 may be referred to as the Comm DB or communications database. Database 450 may be referred to as the blocking DB. In this specific implementation, the database Comm DB is the database on the receiving device where (for SMS texts) the calling/sending phone number and contents of the SMS text message are stored, and (for voice calling) the phone number of the calling device is stored. Additionally, the Blocking DB contains information about which numbers are to be blocked, information about under what conditions calls or SMSs' should be blocked (during these hours of the day), information about categories of senders which should be blocked, information about the association of a caller's number and a category (or categories), information about user-assigned labels for actual communications which occurred (e.g. 'business call' or 'personal call'), the actual records of calls/texts that occurred, etc.

Server 415 can be internal to the system, operated by a carrier (or both, there can be multiple such servers). For example, in a specific implementation, the server is operated internally. In another specific implementation, the server is operated by the carrier (allowing for upstream blocking, but running the system's software or using system's interfaces to access databases or other services providing information (categories, etc.)). In another specific implementation, the server is operated internally and by the carrier. For example, there can be separate servers operated by each party and these communicate with each other; the actual upstream blocking is performed by the carrier. Alternatively, there can be a server running the combination of system services (e.g., software/DB/services/functionality) and the carrier functionality (e.g., upstream blocking and/or hybrid signaling).

In a specific implementation, the following functionality is provided:

(a) Call blocking (inbound, outbound); and
(b) SMS blocking (inbound, outbound)
"Basic" Inbound Call Blocking In a specific implementation, a flow for "basic" inbound call blocking is as follows:

Step 1: The call comes in, and the CallerID is available to indicate the phone number of the caller.

Step 2: The blocking app can observe the CallerId for the incoming call. The blocking app then looks up the CallerId number in the Blocking DB on the device. (There may also be a Blocking DB on the server; the relevant information from the server's DB would be sent periodically to the Blocking DB on the device.)

Step 3: If the CallerId number is listed as indicating that it should be blocked, then the call will be blocked. The user doesn't receive any notification, the call can be blocked silently. In an option, the user can receive a notification that an incoming call was blocked. The call is blocked by the blocking app in the level of the Android framework.

In a specific implementation, the contents of the blocking DB have been downloaded previously from the server to the device. In a variation, the blocking DB (or a copy of it) also exists on the server. Periodically updates to the blocking DB on the server are delivered to the blocking DB on the device; there are several ways in which the blocking DB on the server can be updated (described below).

Periodically updates that have occurred to the blocking DB on the device are uploaded to the server; such updates can include instructions by the user to add a new number to the blocking DB. In a specific implementation, a user interface option allows the user, for a call that has just come in, to click a button that says "block this number."

The blocking DB on the server includes numbers that have been identified as "spam" numbers to block. This information can come from manual entry on the server side. It can come from crawling the web to identify phone numbers that have been complained about by users. It can come from other sources of known spammer phone numbers. It can be "crowd-sourced" in the sense that if a number has been marked by a significant number of users to be blocked, it can be identified as a number to be blocked, or information about the number of people who have chosen to block this number can be provided to the user while the call is incoming, e.g., "237 people have chosen to block this phone number; you can choose to (a) receive this call, or (b) block this call this one time, or (c) block this call and add this phone number to your auto-block list, or (d) choose to never block this phone number." The "blocking DB" can hold not just information on phone numbers to be blocked, but also on phone numbers to be allowed, as in the above example. In an implementation, the system is "crowdsourcing" the numbers that could/should be blocked.

Some reasons for uploading the blocking DB to the server include reuse for other devices owned by the user; "crowd sourcing" of spam numbers, those which are blocked by a large number of users because they are marked as "spam" could potentially be used to provision blocking numbers for other unrelated users; and for use in upstream blocking.

For example, for upstream blocking for SMS, it can avoid SMS text charges; typical SMS blocking prevents presentation of the SMS text to the end user, but typically there is still a charge for having received the SMS text message at the device. Upstream blocking can be used to block messages before receipt and thus before charges have been assessed. For voice, upstream blocking saves on the network minutes used to connect the call to the device; this can avoid a network usage related charge (minutes) for the user.

"Basic" Outbound Call Blocking

In a specific implementation, a flow for "basic" outbound call blocking includes intercepting attempts to call premium numbers. There are premium numbers allocated on a per country basis. E.g., 1-900 numbers in the U.S. Premium-rate telephone numbers are telephone numbers for telephone calls during which certain services are provided, and for which prices higher than normal are charged. Adult chat lines (phone sex) and tech support are a very common use of premium-rate numbers. Other services include directory enquiries, weather forecasts, competitions and voting (especially relating to television shows).

Computer criminals have used premium-rate numbers to defraud unsuspecting users. For example, one scheme involved inducing users to download a program known as a dialer that surreptitiously dialed a premium-rate number, accumulating charges on the user's phone bill without their knowledge. In this specific implementation, the blocking application program can block or notify or prompt the user when there is an attempt to dial such numbers.

"Categorized" Call Blocking

In a specific implementation, techniques for "Categorized" call blocking are provided. In this specific implementation, blocking based on categories, not on lists of actual phone numbers, refers to a process by which one or more labels or categories are associated with a particular phone number. The operational rules or policies regarding blocking are specified in terms of the categories, not in terms of lists of actual phone numbers.

There can be many types of labels or categories. Table A below shows some examples of categories.

TABLE A

| Label/Category | Definition |
| --- | --- |
| Business | The phone number is registered to a business |
| Personal | The phone number is registered to an individual |
| Land Line | The phone number is for a land-line telephone |
| Mobile | The phone number is for a mobile device |
| "YellowPages" category | The website Internet Yellow Pages @ Expo Central available at <http://www.expocentral.com/yellow_pages_categories.html> lists a wide variety of categories and is incorporated by reference. Examples: "Baby Furniture Retail" or "Boat Dealers" |
| NAICS business category | NAICS is the "North American Industry Classification System," a set of multi-level categories for industry maintained by the U.S. Census and is incorporated by reference; see <http://www.census.gov/cgi-bin/sssd/naics/naicsrch?chart=2012> for details. Examples (of high level categories): "23 Construction;" "52 Finance and Insurance;" "53 Real Estate and Rental and Leasing." Intermediate or lower-level categories exist within this |

TABLE A-continued

| Label/Category | Definition |
|---|---|
| | scheme, too; examples are: "522 Credit Intermediation and Related Activities;" "5222 Nondepository Credit Intermediation;" "52221 Credit Card Issuing." |
| Family | The user's family members are in this category. |
| Contacts | Anyone in the user's contact list/address book is in this category |
| Non-Contacts | Opposite of Contacts |
| Approved Caller | e.g., a child's phone may be provisioned with rules which only allow certain numbers to be received, or certain other numbers to be called from the mobile device. |

There can be other types of labels or categories, provisioned by third parties, or manually authored, or crowd-sourced by actual users (users would choose their own "tags" or labels for phone numbers). Users can choose to block (or to allow) calls based on categories.

In a specific implementation, a user might choose to have a call blocking rule:

| BLOCK | LABEL.NAICS = 52221 (credit card issuing) |
|---|---|

"Name Filter" Call Blocking

There can be "Name Filter" call blocking. For example, it is often possible to obtain the name under which the phone number is registered. "Name Filter" call blocking (or allowing) is based on specifying a filter on part of or all of the registered name. E.g., if the user's family name is "Johansson," then the user might want to have a call blocking rule:

| ALLOW | NAME contains "Johanssen" |
|---|---|

In a specific implementation, techniques allow for name matching to allow or block even when the calling phone number is an "unpublished number." An unpublished number is one for which the name information is not publicly disclosed because of a decision made by the phone number owner for privacy reasons; but the telephone company still has that name information. When the "Name Filter" call blocking/allowing operation can run "upstream" of the device, on a server in the telephone company's infrastructure, or in some other server trusted to hold that information, then the privacy of the unpublished number's owner is still preserved, but the name matching can be used by the user on the mobile device to selectively block or allow calls from the unpublished number.

"Time-Based" Call Blocking

In a specific implementation, techniques allow for "Time-based" call blocking. A user may not wish to receive certain calls during certain times of the day or days of the week. Rules to block or allow can be specified.

"Location-Based" Call Blocking

In a specific implementation, techniques allow for "Location-based" call blocking. A user may not wish to receive certain calls when the user is at a certain location or within certain geographic regions. Rules to block or allow can be specified. E.g., a rule may block all calls from telemarketers while at the user's "office" location. This type of blocking may be referred to as context-based blocking. The use of contexts is further described in U.S. patent application Ser. No. 13/686,028, filed Nov. 27, 2012, which is incorporated by reference.

A user may not wish to receive certain calls from numbers originating in or outside of certain geographical areas.

"Event-Based" Call Blocking

In a specific implementation, techniques allow for "Event-based" call blocking. For example, a user may wish to have certain rules in place when the user is in a meeting (as evidenced by the occurrence of a meeting appointment on the user's calendar). Rules may specify, for example, that all calls except those from LABEL=Family should be blocked during meetings.

"Conditional" Call Blocking

In a specific implementation, techniques allow for "Conditional" call blocking. A user may wish to have certain rules in place to block calls only when the device battery is low, for example, or when the user's monthly call minutes are near their limit.

Composite Rule Call Blocking

In a specific implementation, techniques allow for Composite rule call blocking. A user may wish to combine several forms of rules. For example, the user banks at Wells Fargo Bank, but wishes to block calls from all other finance and insurance companies:

| ALLOW | NAME contains "Wells Fargo" |
|---|---|
| BLOCK | LABEL.NAICS = 52221 (credit card issuing) |

Blocking at Device or Upstream in Network

In a specific implementation, a set of rules for blocked or allowed calls (or a list of phone numbers for blocked or allowed calls) may be used to block (or allow) calls at the device itself. Alternatively, such a set of rules or lists can reside "upstream" in the calling network from the mobile device, and can be used to block (or allow) calls at that point. This is advantageous for several reasons: (1) it saves on actual network transmission time for a call that would be blocked; (2) it may save in terms of resources that cost money (call minutes or data minutes, etc.) because the blocked call is not actually delivered to the device, but rather is blocked "upstream." In some cases, however, it will be desirable to perform blocking calls/SMS on the device because such features may not require coordination or cooperation with a third party, e.g., a carrier.

In a specific implementation, there is a blacklist and a whitelist. The blacklist includes a list of categories to block. The whitelist includes a list of categories to allow. In a specific implementation, blacklist blocking is before whitelist allowing. In this specific implementation, the primary use of whitelisting rules is to provide exceptions to blacklist rules that hit entire categories. E.g., I would blacklist credit card companies as a category but whitelist *my* credit card company by name. The whitelist can be exceptions to blacklist rules. To turn this into a complete whitelist function, there would be a blacklist rule BLOCK ALL with specific whitelist exceptions.

Implementation of Categories

In a specific implementation, because only Caller ID may be available at the mobile device, the device or server that makes a decision to block or allow a call may consult an external database or call an external service to obtain the set of labels or categories associated with the calling number. This can all be done in various ways, depending on where the decision is made and where the label/category information resides, and where the name registration information for the calling number resides. E.g., the device could decide, but communicates with the server to obtain the label/category information; or the upstream server could decide (because it has a copy of the user's rules) and can obtain from its own database or the database(s) on other servers the label/category information for the calling number.

In a specific implementation, receipt of the call is delayed until the external service has obtained the set of labels or categories. For example, the system may place the caller on hold while the system determines the category associated with the call. In another specific implementation, the call itself may be routed through the system servers (e.g., a VoIP based telephony network situation) or on carrier servers in which case the Caller ID is available upstream and can be used in block/allow operations. Also, even if the user has used the *67 dialing instruction to block caller ID, it is typically only the last hop in the network that suppresses the caller ID—it flows through the network with the call. In a specific embodiment, there is a server-based implementation that is able to examine the caller ID (similar to 800 service phone numbers and emergency calls).

Spam Calling Documentation

There are "Do Not Call" lists that a user can sign up for. It is a crime for telemarketers to call a number on a do not call list. See <https://www.donotcall.gov/>. This site also has a web interface to file a complaint if such a call was received (see <https://complaints.donotcall.gov/complaint/complaintcheck.aspx?panel=2>).

The Do Not Call Registry contains a web interface to verify if a phone number has been registered on the registry, see: <https://www.donotcall.gov/confirm/conf.aspx?panel=3>. Response is via an email. This information can be obtained by an app on the device or by a server upstream of the device or other server, and that information can be cached at any location. Alternatively, the interfaces defined for Sellers, Telemarketers/Service Providers, or Exempt Organizations can be used to obtain lists of phone numbers that are on the Do Not Call Registry (see <https://www.donotcall.gov/faq/faqbusiness.aspx#how>).

The mobile device can verify if the mobile device's phone number has been registered with the registry. If not, an option can be given to the user to register their phone number with the Do Not Call Registry. See <https://www.donotcall.gov/register/reg.aspx>.

In a specific implementation, the mobile device user is provided with one or more button choices when they receive a call; below are some examples of the options:

1) This is spam; block this number
2) This is spam; block this name
3) This is spam; block this category
4) File a complaint with National Do Not Call Registry In an implementation, this last option would only be presented if the user's mobile device phone number has been verified as having been registered with the National Do Not Call Registry.

Optionally the documentation regarding when the phone call was received, optionally a recording of part of all of the phone call (depending on legality), can be stored for later use in supporting filed complaints. Such information can be sent to a server, if it was detected on the device; or held on the server or sent to another server if it was detected upstream in the calling network. Violators could be fined up to $16,000 per incident.

Similarly, there may be a button to allow for recording a call (both the voice on the call and the metadata about the number that is calling, the time, etc.) for use as evidence. This information would be protected, signed, tamper-proofed, and optionally sent to a server in real-time or subsequently.

User Interfaces for Categories and Rules

In a specific implementation, user interfaces are provided for the user to specify or modify rules and categories on the device, or via the web for any of the user's devices. These can be general configuration UIs, or "in-task-flow" buttons, such as "mark this call as business" or "mark this call as personal." The latter can be used in support of time recording, as for a consultant or business person who wished to categorize his call logs for tax or reimbursement purposes.

SMS Blocking

The above discussion can apply equally to SMS blocking, except for Do Not Call Registry. With respect to the Do Not Call Registry (there is no "Do Not Text" Registry) similar functionality could be implemented.

SMS spam is illegal under common law in many jurisdictions. In the U.S. victims can file complaints with the FCC (see http://www.fcc.gov/complaints). In a specific implementation, there is a button (or a rule) to file a complaint with the FCC upon receipt of SMS spam.

Marking SMS as Spam

Certain SMS can be marked as spam. In this specific implementation, SMS blocking is performed using the Comm DB (where SMS messages are stored) and does not require a special user interface (the phone's default SMS app is used). An SMS can be marked as SPAM by creating (but not actually sending) an SMS draft addressed to a specific number, forwarding the original SMS message.

In this specific implementation, the blocking application can retrieve the content of the draft SMS message from the Comm DB and use that information to categorize the sending number as a number to be blocked for future SMS message receipt. This procedure may be referred to as "hooking" into the process of SMS text flow via the database. The hooking process can also be used to augment text, to censor text (a filter for a child's phone), to categorize (for a filing system), to record statistics on them (e.g., advice for a user on choosing a text/data plan), etc., or to identify anomalous messages (spikes in messages to/from certain numbers, aggregated across a user's device, or multiple devices, or the devices of multiple users).

Auto-Filing SMS Messages

Rules can be specified to automatically file/archive/backup-off-device SMS messages, into certain folders, or with particular tags associated with them.

Permissioned SMS

A password may be required to permit people to SMS the user.

Private SMS

Certain categories/rules can be specified to partition and privacy protect (hide/encrypt) particular SMS messages.

Bulk Delivery SMS

In an option the user can choose to have SMS messages delivered periodically in bulk, particularly using alternate network delivery mechanisms (e.g., over WiFi/Internet instead of over the voice network).

Applying Rules in Carrier Infrastructure or Upstream in Network

The features discussed for voice calls, where rules are applied before the SMS text arrives at the device can be applied upstream in the communication network. For SMS this can be more important, because it allows blocking SMS messages without cost to the user (all SMS messages delivered to the device cost something, whether they are blocked in the device or allowed in the device).

Using Native Phone App Like Using Native SMS App

For SMS blocking the blocking application can hook the SMS DB and can block/allow using the native SMS app. A similar technique may be applied for voice call blocking.

Hybrid Signalling

In a specific implementation, a data connection signal is used to turn on the device's voice radio to receive an important call. For example, a user might have turned off their device's voice network connection (perhaps because the user is in a meeting or does not want to be disturbed or for cost reasons (is roaming)). A call coming in for the device would not go through to the device because the voice network connection is unavailable at the device; but the calling network infrastructure can "look aside" and see that this is a high priority call for which every attempt should be made to deliver the call; in this case the device's data network connection can be tested to see if it is available, and if so, to push a message through the data connection to (a) alert the user and/or (b) cause the voice network connection to be turned on so that the call can be received. This may be referred to as "hybrid signaling" because it is an "out-of-band" signal on the data network that will enable a subsequent voice network connection to be made.

Figure 5:
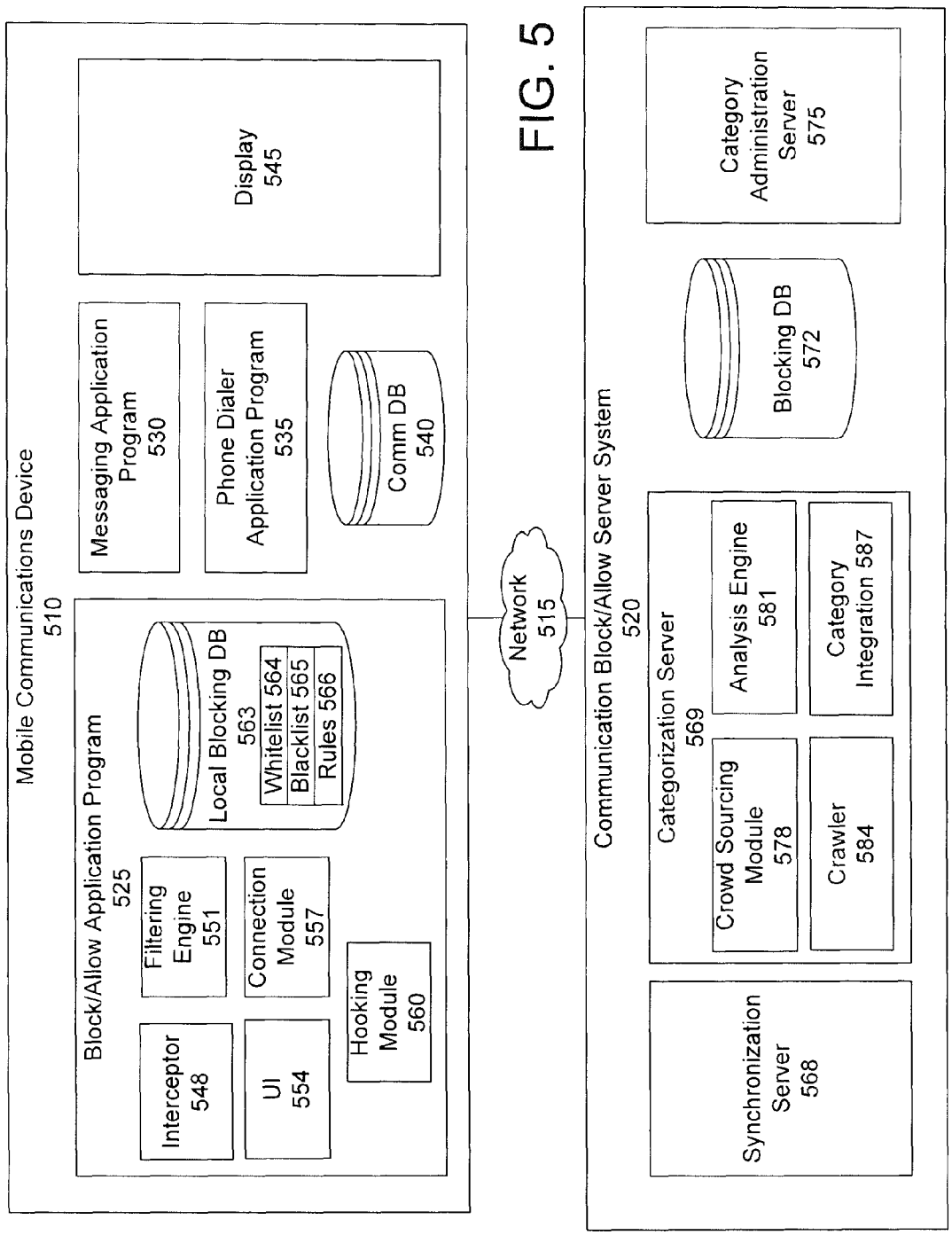
FIG. 5 shows a more detailed block diagram of the system shown in FIG. 3.

FIG. 5 shows a more detailed block diagram of the example shown in FIG. 3. More particularly, a mobile communications device 510 is connected via a network 515 to a communications block/allow server system 520. The mobile communications device includes a communications blocking application program 525, a messaging application program 530, a phone dialer program 535, a communications database 540, and a display 545.

The blocking application program includes several modules including an interceptor 548, a communications filtering engine 551, a user interface 554, a connections interface 557, a hooking module 560, and a local blocking database 563. The local blocking database can include a whitelist 564, a blacklist 565, and a set of rules 566. In various specific implementations, the local blocking database may include the whitelist, but the blacklist may be omitted. The local blocking database may include the blacklist, but the whitelist may be omitted. The local blocking database may include both the whitelist and the blacklist. The whitelist includes a listing of categories to allow. The blacklist includes a listing of categories to block. The set rules include rules pertaining to regulating inbound communications, outbound communications, or both. The blocking application program can evaluate a rule according to the identified category to determine whether a communication should be allowed or blocked.

For example, the whitelist may include the categories Family, and Contacts. If an electronic communication is received from a phone number belonging to a category in the whitelist, the blocking application program can forward the electronic communication to the messaging application or phone dialer program. As another example, the blacklist may include the categories Adult and Advertisement. If an electronic communication is received from a phone number belonging to a category in the blacklist, the blocking application program can block the electronic communication from being received by the messaging or phone dialer program.

The set of rules can provide further control over the forwarding (or not forwarding) of the electronic communication. For example, as discussed above, there can be a first rule that specifies a particular category be blocked, e.g., block messages from credit card issuers. There can be a second rule that specifies an exception to the first rule, e.g., allow messages where NAME=Wells Fargo Bank.

A rule can specify that communications of a particular category are to be blocked when the communications are received while the mobile communications device is in a specific location (e.g., specific geographic location). In a specific implementation, a method includes intercepting a communication identified by a phone number before the communication is received by an application program on a mobile communications device, determining a category of the phone number, determining a current geographic location of the mobile communications device, evaluating a rule specifying communications of the category are to be blocked when the mobile communications device is within a geographic location, if the current geographic location is within the geographic location then blocking the application program from receiving the communication, and if the current geographic location is outside the geographic location then allowing the application program to receive the communication. A geographic location may be specified by global positioning system (GPS) coordinates (e.g., longitude and latitude), zip code, area code, city, town, county, state, country, region, and the like.

As another example, a rule can specify that communications of a particular category are to be allowed when the communications are received while the mobile communications device is in a specific location. In a specific implementation, a method includes intercepting a communication identified by a phone number before the communication is received by an application program on a mobile communications device, determining a category of the phone number, determining a current geographical location of the mobile communications device, evaluating a rule specifying communications of the category are to be allowed when the mobile communications device is within a geographic location, if the current geographic location is within the geographic location then allowing the application program to receive the communication, and if the current geographic location is outside the geographic location then not allowing the application program to receive the communication.

A rule can specify that communications of a particular category are to be blocked when the communications are received during a specific time period. In a specific implementation, a method includes intercepting a communication identified by a phone number before the communication is received by an application program on a mobile communications device, determining a category of the phone number, determining a current time, evaluating a rule specifying communications of the category are to be blocked during a time period, if the current time is within the time period then blocking the application program from receiving the communication, and if the current time is outside the time period then allowing the application program to receive the communication. The time period may be defined as a weekday, weekend, portion of a day (e.g., 6:00 p.m. to 7:00 a.m.), any continuous period of time, or combinations of these.

A rule can specify that communications of a particular category are to be allowed when the communications are received during a specific time period. In a specific implementation, a method includes intercepting a communication identified by a phone number before the communication is received by an application program on a mobile communications device, determining a category of the phone number, determining a current time, evaluating a rule specifying communications of the category are to be allowed during a time period, if the current time is within the time period then allowing the application program to receive the communication, and if the current time is outside the time period then not allowing the application program to receive the communication.

A rule can specify that communications are to be blocked when the communications are received when a charge level of a battery of the mobile communications device is below a threshold charge level. In a specific implementation, a method includes intercepting a communication identified by a phone number before the communication is received by an application program on a mobile communications device, determining a category of the phone number, determining a current charge level of the battery, evaluating a rule specifying communications of the category are to be blocked when the battery is below a threshold charge level, and if the current charge level is below the threshold charge level then not allowing the application program to receive the communication. The charge level can be specified in milliampere-hour (mAh) or another suitable unit of electrical charge.

A rule can specify that communications are to be allowed when the communications are received when a charge level of the battery is above a threshold charge level. In a specific implementation, a method includes intercepting a communication identified by a phone number before the communication is received by an application program on a mobile communications device, determining a category of the phone number, determining a current charge level of the battery, evaluating a rule specifying communications of the category are to be allowed when the battery is above a threshold charge level, and if the current charge level is above the threshold charge level then allowing the application program to receive the communication.

A rule can specify that communications of a particular category are to be blocked when a monthly communications usage total is above a threshold value. In a specific implementation, a method includes intercepting a communication identified by a phone number before the communication is received by an application program on a mobile communications device, determining a category of the phone number, determining a current usage balance, evaluating a rule specifying communications of the category are to be blocked when a usage balance is above a threshold value, and if the current usage balance is above the threshold value then not allowing the application program to receive the communication. A usage balance may be specified in units of time (e.g., minutes), or data size (e.g., megabytes or gigabytes).

A rule can specify that communications of a particular category are to be allowed when a monthly communications usage total is below a threshold value. In a specific implementation, a method includes intercepting a communication identified by a phone number before the communication is received by an application program on a mobile communications device, determining a category of the phone number, determining a current usage balance, evaluating a rule specifying communications of the category are to be allowed when a usage balance is below a threshold value, and if the current usage balance is below the threshold value then allowing the application program to receive the communication.

As shown in FIG. 5, in a specific implementation, the server system includes a synchronization server 568, a categorization server 569, a blocking database 572, and a category administration server 575. The categorization server includes a crowd sourcing module 578, an analysis engine 581, a crawler 584, and a category integration services module 587.

Communications database 540 stores information associated with inbound and outbound electronic communications. For text messages, the information can include the calling or sending phone number and the content or body of the message. For voice calls, the information can include the phone number of the calling device.

FIG. 6 shows an example of some of the information that may be stored in communications database 540. As shown in FIG. 6, entries or records 605 in the database can include a set of fields or columns that store various attributes or values of a text message, voice call, or both. For example, a field 610 stores a message identifier, a field 615 stores the sender (e.g., sender phone number), a field 620 stores the body or content of the message, a field 625 stores the status of the message (e.g., received, sent, or draft).

Although FIG. 6 shows four fields for an entry, it should be appreciated that there can be any number of fields associated with an entry. For example, there may be fields storing information such as date and/or time a message was received, date and/or time a message was sent, date and/or time a call was received, date and/or time a call was placed, type (e.g., inbound message, outbound message, inbound call, or outbound call), attachments, phone number the message was sent to, duration of a call, phone number that a call was made from, a phone number that was called, and many others.

Referring now to FIG. 5, the interceptor module is responsible for intercepting an electronic communication. In a specific implementation, the electronic communication includes an incoming text message from a sending phone number. The message is intercepted by the interceptor before the message is received by the messaging application program. The filtering engine can use the information stored in the local blocking database, consult the server system, or both to determine a category associated with the message phone number. Based on the category, the blocking application can forward the message to the messaging application, thereby allowing the message to be received by the messaging application. Alternatively, the blocking application can not forward the message, thereby blocking the message from being received by the messaging application.

In another specific implementation, the electronic communication includes an incoming voice call from a calling number. The voice call may similarly be intercepted by the interceptor before the voice call is received by the phone dialer application program. The system determines a category associated with the calling number. Based on the category, the call may or may not be forwarded to the phone dialer program to receive.

In another specific implementation, the electronic communication includes an outbound text message. The interceptor can intercept the outbound text message before the message is transmitted off the mobile communications device. For example, the outbound text message may have been initiated by a malicious application program on the mobile device and without the user's authorization. Intercepting the text message can prevent the message from being sent by the messaging application or the malicious application.

In another specific implementation, the electronic communication includes an outbound call. The interceptor can intercept the outbound call before the call is placed. For example, as discussed above, the outbound call may be to a premium rate number and may have been initiated by a malicious application program. Intercepting the call attempt can prevent the call from being made by the malicious application or the phone dialer application.

The connection module is responsible establishing a connection with the server system. A connection may be established in order to identify a category associated with the phone number of the intercepted communication. In a specific implementation, the phone number is transmitted from the mobile device to the server. The server cross-references the phone number to a category associated with the phone number. The identified category allows the filtering engine to then consult the local blocking database and make a decision on whether the electronic communication should or should not be forwarded to the messaging or phone dialer program. For example, there may be rule specifying that communications belonging to the category "Adult" should be blocked. The connection module can also export the local database to the server system and receive updates from the server system.

A user interacts with the blocking program through the user interface which is shown on the display. For example, through the user interface, the user can create and modify categories, create and modify rules, manage incoming messages and calls, manage outgoing messages and calls, or combinations of these.

The hooking engine is responsible accessing communications database 540. The communications database may be accessed in order to categorize or classify an incoming text message, modify a received text message, delete a stored message, delete a phone number, annotate a stored message, or combinations of these.

The categorization server is responsible for analyzing and categorizing phone numbers. The categorization server can maintain a categorized listing of phone numbers. A particular category may include any number of subcategories. For example, the categories may be arranged in a hierarchy. In an implementation, the system provides several techniques for categorizing phone numbers. A first technique includes obtaining category information through the crowd sourcing module. A second technique includes obtaining category information through the crawler program. A third technique includes obtaining category information produced by other application programs outside of the system. For example, the category integration services module can import phone number category data from an external system and save the data in blocking database 572.

The synchronization server is responsible for handling category updates, rule updates, or both between the local blocking database and the server blocking database.

The category administration server acts as an administrator user interface to the system. Some examples of administration tasks that may be supported by the administration server include category maintenance, category import, category export, reporting, trend analysis, and many others.

Figure 7:
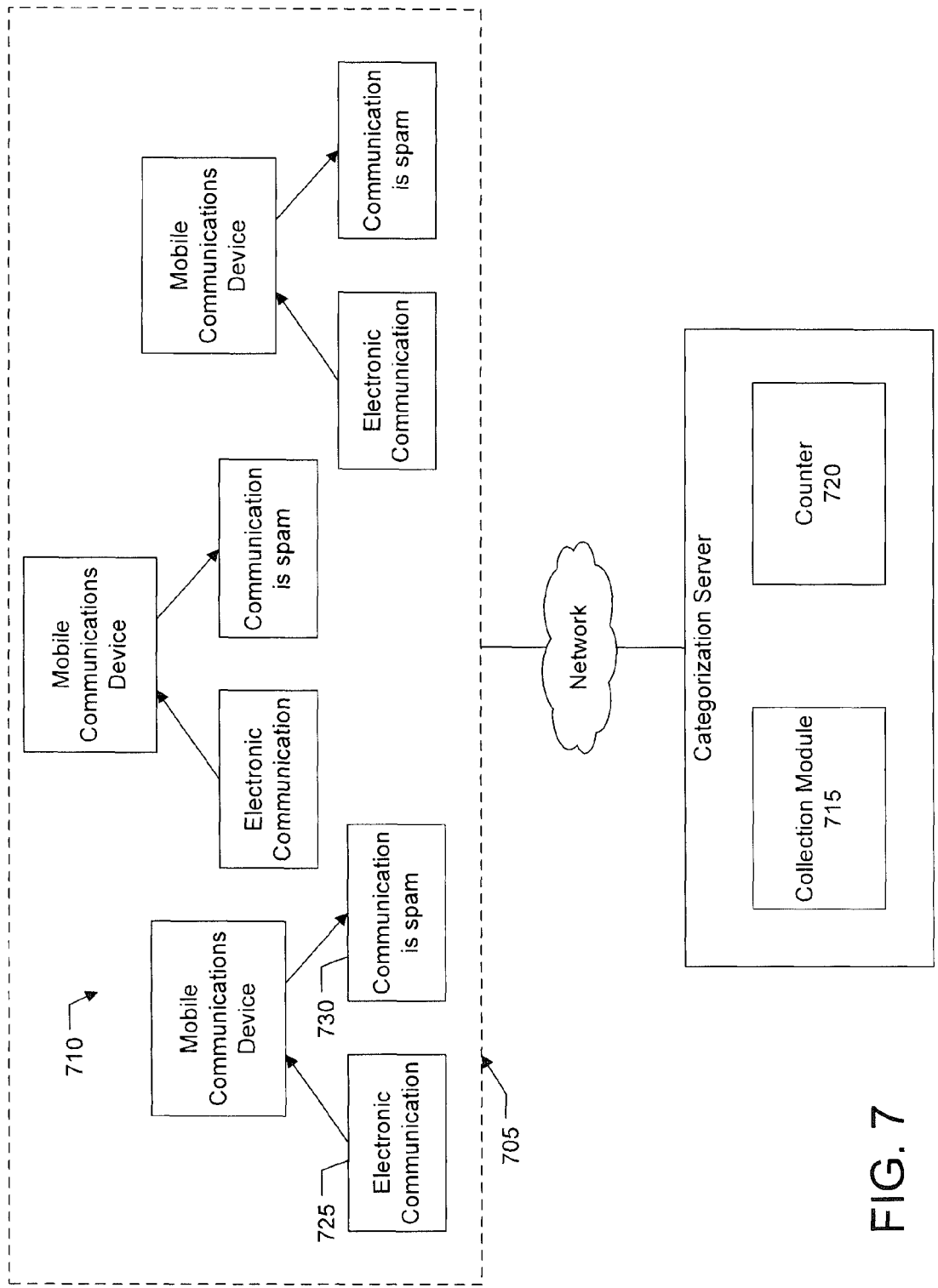
FIG. 7 shows a block diagram for crowd-sourced categorizations.

FIG. 7 shows an example of using a crowd 705 to categorize phone numbers. The crowd includes any number of mobile communication device users 710. For example, there may be tens, hundreds, thousands, or even millions of users in the crowd. The categorization server includes a collection module 715 and a counter 720. The collection module collects information from the crowd. The counter module tracks the collected information.

Figure 8A:
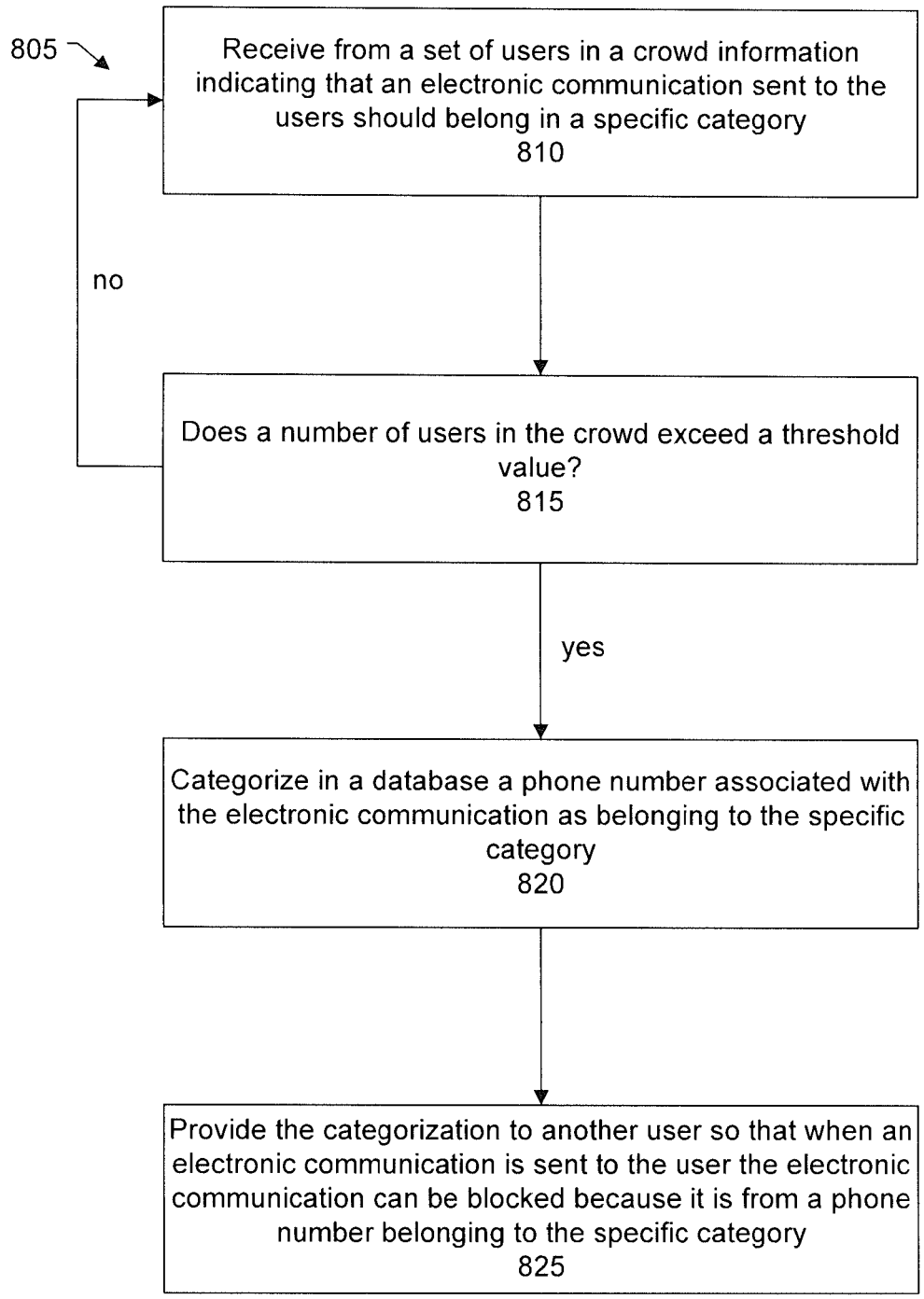
FIG. 8A shows a flow for crowd sourcing categorizations.

FIG. 8A shows a flow 805 for crowd-sourced categorization. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 810, the system receives from a set of crowd users information indicating that an electronic communication sent to a mobile device of each user of the set of crowd users should belong in a specific category, e.g., "spam." For example, a crowd user may be sent a communication such as an unsolicited text message 725 (FIG. 7). The crowd user reviews the unsolicited text message and identifies the message as belonging to a "spam" category 730. Upon identifying the unsolicited text message as belonging to the "spam" category, the crowd user forwards an identifier or phone number associated with the message to categorization server. The crowd user may forward the message to a designated "spam" phone number. For example, the number (415) 555-SPAM (i.e., (415) 555-7726) may be designated as the number to receive messages identified as "spam."

The system tracks and counts the number of users who report a particular message or number associated with the message as belonging to the specific category, e.g., "spam." Table B below shows an example of some of the tracking information that the system may maintain. The system may also count the number of users that received a communication from a phone number already being tracked is not reported as spam.

TABLE B

| Identifier (e.g., phone number) | Number of users reporting identifier as "spam" | Number of users receiving calls from number and not reporting identifier as "spam" |
| --- | --- | --- |
| (415) 555-5094 | 5 | 421 |
| (415) 555-7896 | 357 | 3 |

A first column lists the identifier or phone number from which the message was sent. A second column lists the number of users reporting the corresponding identifier as spam. A third column lists the number of users who have received calls from the identifier or phone number and have not reported the corresponding identifier as spam. In the example above, 5 users have reported the number (415) 555-5094 as being associated with "spam" and 357 users have reported the number (415) 555-7896 as being associated with "spam," and 421 users who have received calls from the number (415) 555-5094 have not reported the number as being associated with "spam" and 3 users who have received calls from the number (415) 555-7896 have not reported the number as being associated with "spam."

In a step 815, the system determines whether a number of users reporting a particular phone number as belonging to the specific category (e.g., spam) exceeds a threshold value. In a step 820, if the number exceeds the threshold value, the system categorizes the phone number as belonging to the specific category (e.g., spam).

The threshold value can be configurable by an administrator of the system. For example, the administrator can set the threshold value to be 100, 200, 300, 400, 500, more than 500 users, less than 100 users, or any value as desired. The threshold value helps to ensure good categorization accuracy. A phone number will be categorized into the specific category based on a large number of users agreeing that the phone number belongs in the specific category. As an example, consider that the administrator has set the threshold value to be 237. The data in Table B above shows 5 users have reported messages sent from the phone number (415) 555-5094 as being "spam." However, 5 users is less than the threshold value of 237. So, the phone number (415) 555-5094 would not be categorized as "spam." But, 357 users have reported that messages sent from the phone number (415) 555-7896 are "spam." Because 357 is greater than the threshold value of 237, the phone number (415) 555-7896 would be categorized as "spam." Using crowd sourcing to perform categorization helps to lower the overall cost of maintaining an accurate and up-to-date database of categorized phone numbers.

In a step 825, the system provides or makes available the categorized phone numbers to a user. The user does not have to be a member of the crowd. The categorized phone numbers may be provided as a service (e.g., web service) to the user, through an application programming interface (API) to other applications, displayed graphically on an electronic screen, provided in a report, or combinations of these. Thus, when the user is sent a message from a particular phone number, the system can cross-reference the particular phone number with a database of categorized numbers. If the particular phone number has been categorized as "spam" the message can be blocked because the message is from a phone number associated with "spam."

Figure 8B:
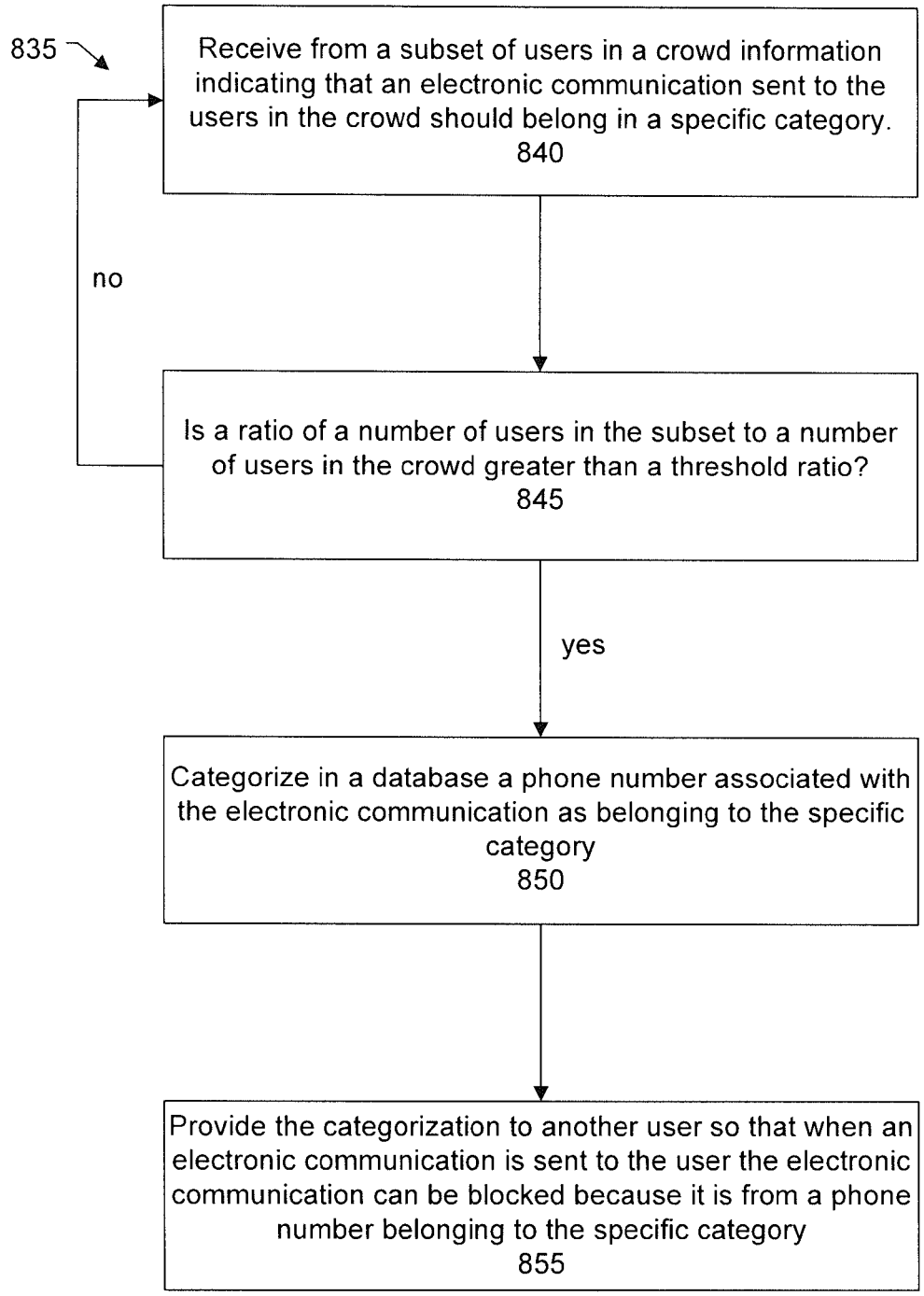
FIG. 8B shows a flow of another specific implementation for crowd sourcing.

FIG. 8B shows a flow 835 of another specific implementation of crowd-sourced categorizations. In brief, in a step 840 the system receives from a subset of users in a crowd information indicating that an electronic communication sent to the users in the crowd should belong in a specific category (e.g., "spam"). In a step 845, the system determines whether a ratio of a number of users in the subset to a number of users in the crowd is greater than a threshold ratio value. Steps 850 and 855 are similar to steps 820 and 825, respectively, as shown in FIG. 8A and described in the discussion accompanying FIG. 8A.

Referring now to step 845, in this specific implementation, it is also possible to have a check that the ratio of spam reports to spam non-reports exceeds a different threshold (i.e., threshold ratio value); this would be used to prevent a small number of members of the crowd reporting a number as "spam" when in fact most all other users do not report the same number. The threshold ratio value can be configured in a manner similar to configuring the threshold value as described above in step 815. For example, the administrator can set the threshold ratio to be 20, 30, 40, 50, 60, 70, 80 percent, more than 80 percent or less than 20 percent.

Combinations of number threshold and ratio threshold can be used. There can be a rule based on ratios and/or numbers and/or combinations thereof. For example, there can be a rule specifying if a number exceeds 50 users reporting "spam" and ratio is greater than 60 percent then categorize the phone number as being associated with "spam." As another example, there can be a rule specifying if a number exceeds 200 users reporting "spam" and ratio is greater than 30 percent then categorize the phone number as being spam.

Figure 8C:
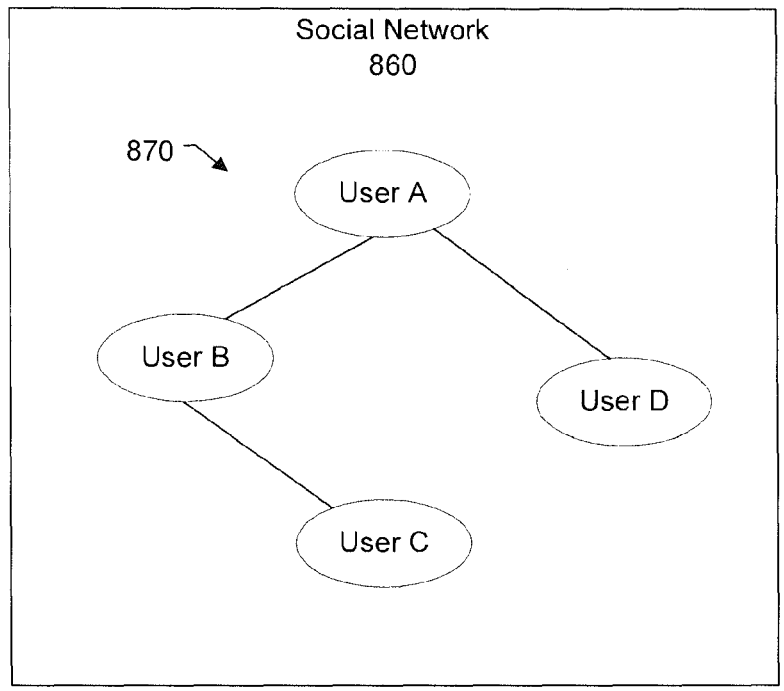
FIG. 8C shows an example of social network searching.
Figure 8C:
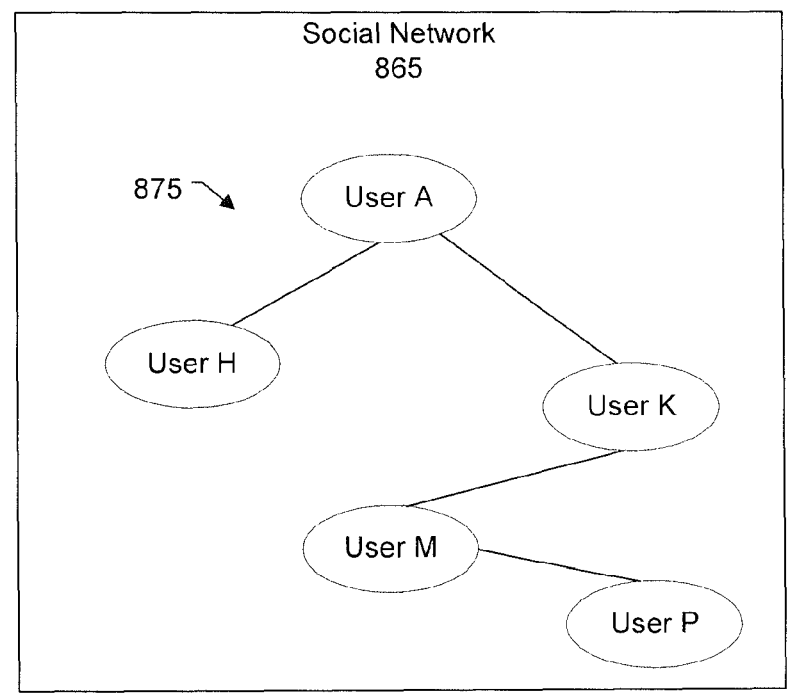

FIG. 8C shows a block diagram of a set of social networks or media services that may be searched in order to determine whether an incoming communication should or should not be considered "spam." In the example shown in FIG. 8C, there is a first social network 860 and a second social network 865. Some examples of social networks include Facebook, LinkedIn, and others. First social network includes a first social graph 870. Second social network includes a second social graph 875. A user R is not a member of any social network.

In a specific implementation, the tracking of numbers and ratios of users in the crowd who have (and have not when given the opportunity to do so) marked the identifier as spam can also be tracked with respect to the user's social graph. The social graph is defined as the network of relationships among users as defined in one or more social media services (such as Facebook or LinkedIn or others).

The system may have a preconfigured distance in the social graph for which it tracks such information, or the user may specify a desired distance in the social graph. For example, the system may be preconfigured to additionally show tracking numbers for the subset of the crowd that is within distance two in the user's social graphs. A user A who is directly linked to a user B in a social graph has a distance of one to user B. If user B is directly linked in turn to a different user C (who is not directly linked to user A) then the distance from user A to user C is two.

In other words, as shown in the first social graph of the first social network, a degree of separation between user A and user B is one because there is one link between user A and user B. A degree of separation between user A and user C is two because there are two links between user A and user C. As another example, as shown in the second social graph of the second social network, a degree of separation between user A and P is three because there are three links between user A and user P.

Rules regarding the numbers and ratios of those marking identifiers as being associated with spam can reference the numbers and/or ratios for the crowd as a whole, and/or the numbers and ratios for the configured subset of the crowd that constitutes the nearby portion (as configured) of the user's social graph. Additionally, tracking for numbers and ratios for the user's social graph may be available for any distance in the social graph, and the rules specified can include tests for the distance within the social graph.

For example, a rule could test for the spam ratio within the user's closest associates (distance=1) exceeding 20 percent, or for the spam ratio within the user's further out associates (distance<=3) exceeding 30 percent or the spam ratio for the crowd as a whole exceeding 40 percent or the number for the crowd as a whole exceeding 500.

In a specific implementation, when a call is coming in, a method includes looking up the number in a plurality of systems or databases including social graph information and providing the user with additional information for the incoming communications, e.g., this call is from a user at distance 2 in the user's Facebook social graph and distance 3 in the LinkedIn social graph, together with additional information such as the user's name (which might not be available through other information sources). The additional information may include a caller's (or message sender's) acquaintances, friends, colleagues, relatives, work history, hobbies, interests, likes, dislikes, tweets, @ mentions, or another piece of profile attribute or combinations of profile attributes that may be collected by the social network. The additional information may include text, graphics (e.g., pictures, or images), audio, video, or combinations of these.

Using a user's social network to analyze an incoming communication (e.g., text message or voice call) may be referred to as a "Crowdsourced Anti-telemarketing System." In a specific implementation, telemarketers are targeted by creating a system which is part crowd-sourced and part data mining. There can be a first part and a second part.

A first part can include a client application (or app). In this specific implementation, the app asks the user to opt in to share contact information and call log data with a server. Whenever a call is received there is a search in the client's social network (contacts and their address books) where it searches friends and friends of friends to see who is calling. If it finds a friend in a network it will notify the user who it is. It then shows the user who it is based on the call network. If a number cannot be found the app can warn the user that it is a telemarketer.

For example, user A may belong to the first social network and be associated with the various members of the first social network as shown in the first social graph. When a call for user A is received, the app can search the first social network to determine whether the caller is any of the members in the first social network. If the caller is not a member of the social network, the app can provide an indication that the caller is outside of user A's social network. For example, the caller may be a user R.

If the caller happens to be within the first social network, the app can provide an indication of the degree of separation between the user (e.g., user A) and the caller. This can help user A determine whether or not to accept or decline the call.

The app may additionally search the second social network. Consider, as an example, that user A is a member of the first and second social network. If the call cannot be found within user A's first social graph, there can be a search of another social network in which user A is a member. Thus, upon not finding the caller in the first social graph of the first social network, the app may search the second social graph of the second social network.

In a specific implementation, the mobile device is sent a database of blacklists, whitelists, or both. A number that calls more than, for example, 5000 times to the users in the system can be marked. If a number is not in the blacklist/whitelist file the app can ask the user to label the call immediately so that information is received immediately. This allows a review system which gathers unknown numbers immediately. A Bayesian model on the server side can be used to analyze the unknown numbers.

A second part can include server side techniques. In this specific implementation, a model is created for figuring out who the telemarketers are. There can be different social networks for different users and a model can be created based on who is getting calls.

In a specific implementation, a method includes receiving, at a mobile communications device of a user, an electronic communication identified by a phone number before the electronic communication is received by an application program on the mobile communications device, searching a social network including the user and another member, where the phone number belongs to the other member, and the user and the other member are separated by a degree of separation, and based on the degree of separation, forwarding or not forward the electronic communication to the application program.

A search for the communication originator (e.g., voice caller or message sender) may include searching a first social network in which the user (i.e., recipient) is a member, not finding the originator in the first social network, and upon not finding the originator, searching a second social network, different from the first social network, in which the recipient is a member. Any number of social networks may be searched.

Figure 9:
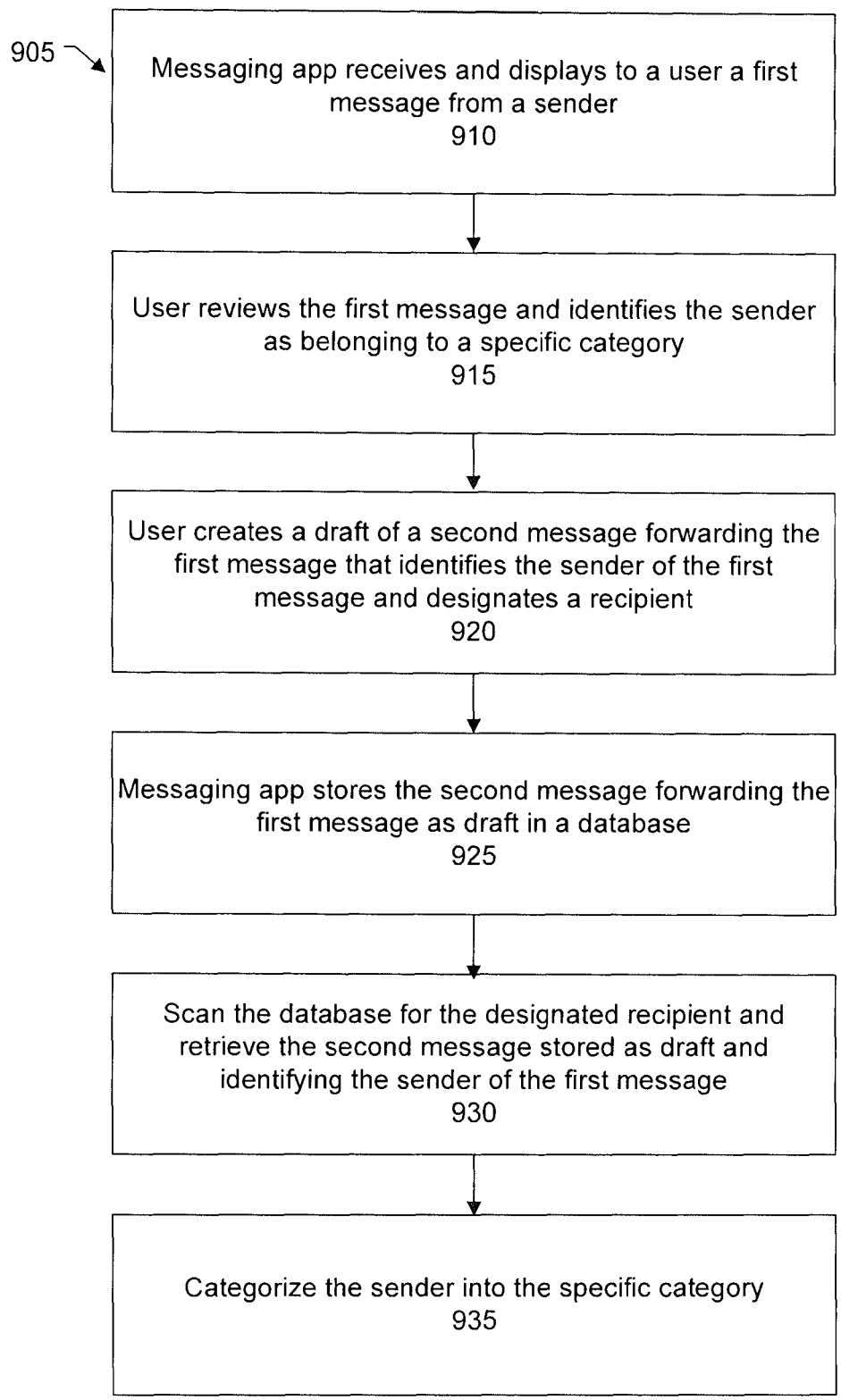
FIG. 9 shows a flow for database hooking.

FIG. 9 shows an overall flow 905 for database hooking. A specific application of database hooking is message categorization. In brief, in a step 910, a messaging application program receives and displays to a user a first message from a sender. In a step 915, the user reviews the first message and identifies the sender as belonging to a specific category, e.g., "spam." In a step 920, the user creates a draft of a second message forwarding the first message. The second message forwarding the first message can identify the sender of the first message (e.g., sender phone number). The second message is addressed to a designated recipient, such as a designated spam phone number provided by the system. In a step 925, the messaging application stores the second message as a draft in a database (e.g., communications database 445).

FIG. 10 shows an example of the state of the communications database after step 925. A record 1005 represents the first message sent to the user which the user has identified as "spam." According to the data stored in the database, the first message was sent from a sender (555) 867-5309, and includes the text "Congratulations! You just won a trip around the world. Complete this short survey to claim your prize."

A record 1015 represents the second message forwarding the first message. As shown in FIG. 10, the body of the second message includes the header text "Forwarding Message from (555) 867-5309" and the copied text of the first message, i.e., "Congratulations! You just won a trip around the world. Complete this short survey to claim your prize." The header and copied text of the first message can be automatically inserted into the second message when the user selects the message forwarding option. In a specific implementation, the forwarding operation is performed by the messaging application. That is, the messaging application includes a user option to forward a received message. In another specific implementation, the blocking application includes a user option to forward a received message.

FIG. 10 further shows that the second message is addressed to a designated recipient (415) 555-SPAM or (415) 555-7726, and that the second message has a status of "Draft." The "Draft" status indicates that the message has not yet been sent. That is, the second message has not yet been transmitted to the communication delivery infrastructure for delivery via the wireless carrier to the designated recipient (415) 555-SPAM (or (415) 555-7726).

In a step 930 (FIG. 9), the blocking application program scans the database for the designated recipient. In this example, the blocking application accesses the database and searches the "Recipient" field for the designated recipient "(415) 555-SPAM." Upon finding a match, the blocking application can retrieve the corresponding message stored as draft in the database. In this example, the blocking application retrieves second message 1015 forwarding first message 1005.

In a step 935, the system categorizes the sender of the first message as belonging to the specific category, e.g., "spam." For example, the number (555) 867-5309 may be labeled or tagged as "spam" and stored in a categorization database. Categorization may performed at the mobile communications device, server, or both. In a specific implementation, an indication or labeling of the sender phone number as being associated with "spam" is transmitted to the server system via Wifi and not via the wireless carrier network. If a Wifi connection is not available the blocking application can store the information (i.e., the labeling of the sender as "spam") and send the information when a Wifi connection becomes available.

An advantage of the database hooking technique is that the user does not incur text message or data charges in connection with categorizing the sender of the first message as "spam." The sender can be categorized without incurring data charges. In this specific implementation, the second message forwarding the first message is not transmitted across the wireless carrier network. That is, in this specific implementation, the second message is not transmitted using cellular protocols such as Enhanced Data GSM Environment (EDGE), General Packet Radio Services (GPRS), Generation three (3G), Universal Mobile Telecommunication Service (UMTS), Wideband Code-Division Multiple Access (WCDMA), High-Speed Downlink Packet Access (HSDPA), Evolution Data Maximized (EVDO), and the like. Rather, the second message or information associated with the second message is transmitted using an Internet-based network protocol such as Wifi. Other examples of Internet-based network protocols include Transmission Control Protocol (TCP) and Internet Protocol (IP) (TCP/IP), Hypertext Transfer Protocol (HTTP), File Transfer Protocol (FTP), and others.

In other words, in a specific implementation, the blocking application program can "hook" and obtain the contents of the SMS (or MMS) draft and act upon it; but the user doesn't have to actually SEND the SMS (thus incurring SMS texting charges). An SMS (or MMS) message can be analyzed as originally received. In a specific implementation, the operation of creating a draft is intended where the user is assisting the categorization process by deciding based on the user's criteria that the message is spam. In order to indicate that the message is spam, the user has to notify the system that the message is spam. The user received the spam message in the SMS text message application on the user's phone; this application is typically the one that comes with the phone, and is not the blocking application program of the system. That is, the blocking application program is different from the text message application. The blocking application program may execute separate from the text message application. The blocking application program may be independent from the text message application. The blocking application may be installed on the mobile communications device after the text message application is installed on the device.

A feature of the blocking application allows the user to conveniently notify the system that a received message is spam. The user could forward the message to the system inside the SMS text message application. But SMS text messages often incur charges to the user for sending SMS text messages. Applicants have developed a technique for notifying the system of spam without the user incurring a charge for sending an SMS text message. In a specific implementation, the technique includes instructing the user to simply create a DRAFT SMS text message forwarding the spam SMS text message (but not actually sending it—it is a draft), then the draft is saved in the Comm DB. The blocking application program, by hooking the Comm DB can see the newly composed and saved draft; thus the system can see the user's decision that the forwarded SMS text message (not actually forwarded, just saved in draft) is spam, and can take the appropriate actions. Thus the user can conveniently make a decision, and notify the system that the SMS text message is spam without having had to incur a charge for actually sending/forwarding an SMS text message.

In other words, Applicants have recognized that SMS data is stored in a database such as on an Android phone. Because of that, the blocking application can access all the information from the database and communicate with the database instead of using an API to work with the SMS application program. After the SMS has been received it hits the database; there is can be option for the blocking application program to prevent something from hitting the database. In various implementations, the blocking application program can be configured to operate on stored, drafts, inbound, outbound messages, or combinations of these. The blocking application can be configured to reorganize messages stored within the database (e.g., modifying, removing, annotating, categorizing). Generally, any resident SMS app interacts with the SMS (or MMS) database. In a specific implementation, the blocking application program can interact with any resident SMS app. SMS app looks into the database to put an SMS feed on the screen. Applicants have appreciated that changing the database can effect a change in what is displayed by the SMS (or MMS) application to the end user.

Applicants have discovered that other apps use the Android "intent" mechanism and intent filtering to access inbound SMS text messages. Android defines a way that different apps can register to be a filter on intents (in this case, specifically, the incoming SMS text message intent). Thus, there may be multiple apps registered on the filter chain for this intent. But, any app on the filter chain can choose to not let the intent bubble further along the filter chain, thus it is possible that some apps registered on the filter chain may not see the incoming SMS text message intent, and thus may not see the incoming SMS text message. Outbound SMS text messages are not handled in Android the same way with respect to intents, thus it is not possible to register to filter outbound SMS text messages.

However, the blocking application program can access the outbound messages after the fact of their having been sent, because they will be stored in the Comm DB as Sent SMS text messages. In a specific implementation, there is no blocking to be done on outbound SMS text messages. However, accessing the sent SMS text messages can allow for categorizing them for the user's personal filing purposes. Also, SMS text messages can be sent directly by the user himself, or can be sent on the user's behalf by an application. In the former case, there is no spam identification to be done, the user himself actually sent this message. But in the latter case, if a sent SMS text message looks like spam (based on other criteria used to categorize something as spam), the system can so mark it for the user to review, or potentially to mark the app that sent the SMS text message as one that is potentially sending spam from the user's device.

Figure 11:
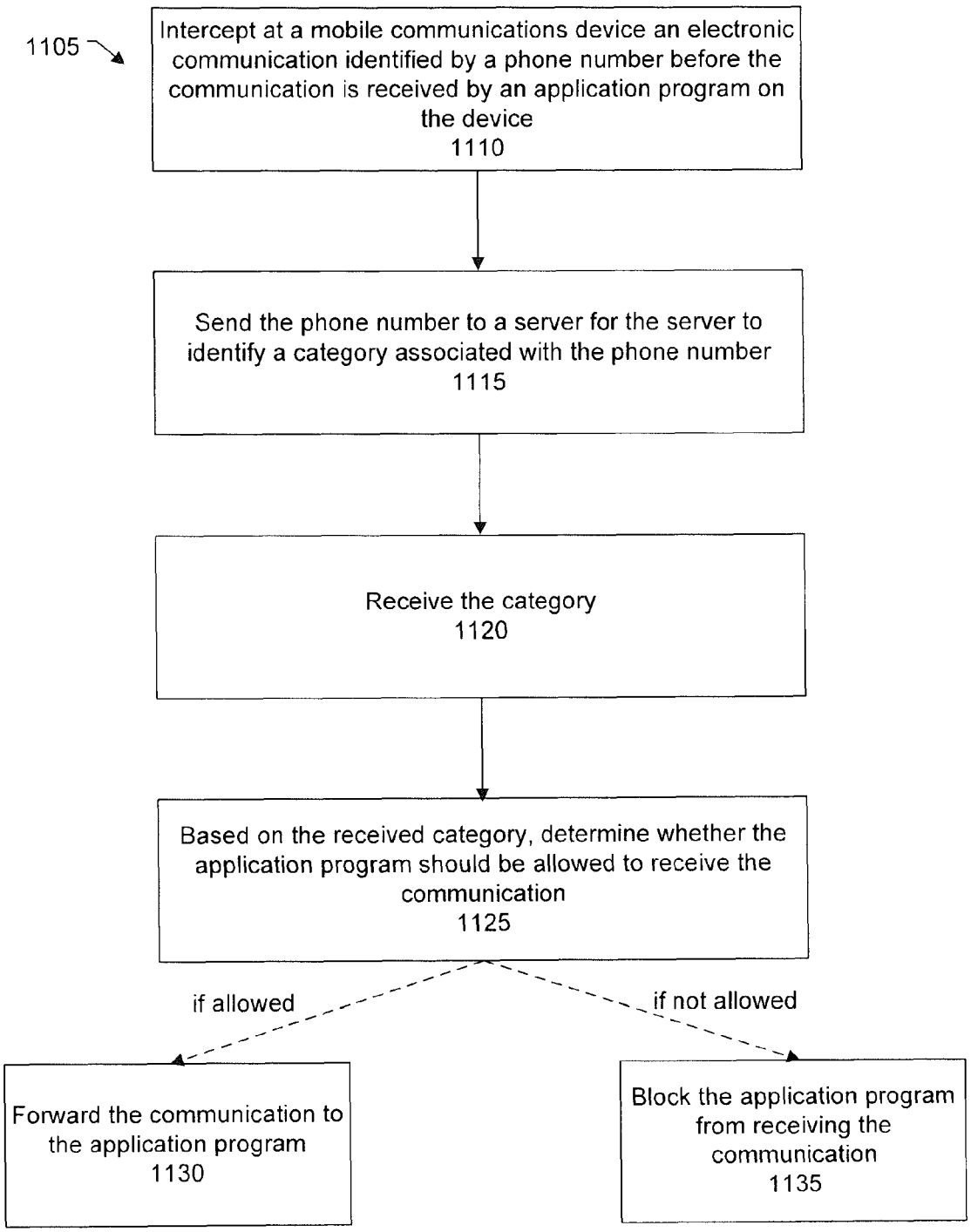
FIG. 11 shows a flow for intercepting an electronic communication and identifying its associated category.

FIG. 11 shows an overall flow 1105 of a specific implementation of category-based blocking. In a step 1110 a blocking application program intercepts at a mobile communications device an electronic communication identified by an identifier before the electronic communication is received by another application program on the mobile communications device. The identifier can be any unit of information that identifies a sender of the electronic communication. In a specific implementation, the identifier is a phone number, the electronic communication is one of text message (e.g., SMS text message or MMS text message) or voice call, and the other application program is one of a text messaging or phone dialer program.

In a step 1115, the blocking application sends the intercepted identifier (e.g., phone number) to a server for the server to identify a category associated with the phone number. The server can cross-reference the identifier with a categorized listing of identifiers to determine the category associated with the identifier. Upon identifying the category, the server can transmit the category to the mobile communications device.

Storing the categorized listing of identifiers (e.g., phone numbers) at the server helps to conserve storage space on the mobile communications device. There are literally hundreds of millions of phone numbers in use. Thus, the size of the database may be very large and the mobile communications device may not have sufficient storage space. In another specific implementation, the database or a portion of the database may be stored at the mobile communications device. An advantage of this approach is that a network connection does not have to be established for cross-referencing the intercepted identifier with the database.

In a step 1120, the blocking application program receives the category from the server. In a step 1125, based on the received category, the blocking application determines whether the application program (e.g., messaging application or phone dialer application) should be allowed to receive the electronic communication.

In a specific implementation, the decision to allow or not allow includes comparing the received category to a list of categories stored on the mobile communications device. If the list includes the received category, a determination is made that the application program should not be allowed to receive the electronic communication. If the list does not include the received category, a determination is made that the application program should be allowed to receive the electronic communication. For example, the list may be a blacklist of categories to block.

In another specific implementation, the decision to allow or not allow includes comparing the received categories to a list of categories stored on the mobile communications device. If the list includes the received category, a determination is made that the application program should be allowed to receive the electronic communication. If the list does not include the received category, a determination is made that the application program should not be allowed to receive the electronic communication. For example, the list may be a whitelist of categories to allow.

In another specific implementation, both a whitelist and blacklist of categories may be examined. The blacklist may be examined before or after the whitelist. The whitelist may be examined before or after the blacklist. In a specific implementation, if the received category is not in the blacklist and the whitelist the electronic communication is blocked. This represents a conservative approach to blocking and allowing communications. In another specific implementation, if the received category is not in the blacklist and the whitelist the electronic communication is allowed. This represents a less conservative approach to blocking and allowing communications.

In a step 1130, if the blocking application determines that the electronic communication should be allowed, the blocking application forwards the electronic communication to the application program (e.g., text messaging or phone dialer program). In a step 1135, if the blocking application program determines that the electronic communication should not be allowed, the blocking application blocks the application program from receiving the electronic communication. The blocking application will not forward the electronic communication to the application program.

Figure 12:
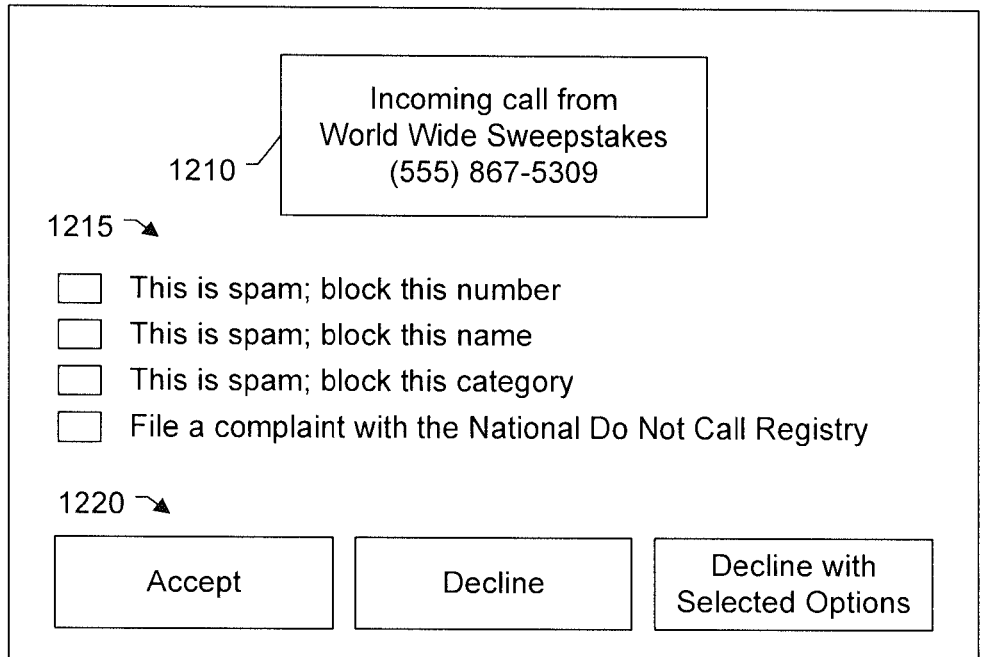
FIG. 12 shows an example of a graphical user interface for blocking an incoming call.

FIGS. 12-15 show specific implementations of graphical user interfaces that may be provided by the blocking application program and shown on a display of the mobile communications device. FIG. 12 shows an example of GUI for categorizing a received call as "spam." A display 1205 includes an alert 1210, a set of user-selectable options 1215, and a set of buttons 1220.

The alert notifies the user that an incoming call from an organization named "World Wide Sweepstakes" has been received. The alert includes the phone number of the organization, i.e., "(555) 867-5309." The set of user-selectable options includes first, second, third, and fourth checkboxes. Selecting the first checkbox allows the user to categorize the call as spam and block the number, i.e., block the phone number "(555) 867-5309." Selecting the second checkbox allows the user to categorize the call as spam and block the name, i.e., block calls from the organization named "World Wide Sweepstakes." Selecting the third check box allows the user to categorize the call as spam and block the category associated with the number, i.e., block calls from sweepstakes sales promotion companies. Selecting the fourth check box allows the user to file a complaint with the National Do Not Call Registry.

Upon making a selection, the user can click a button "Decline with selected options" to decline the call with the options the user selected. Alternatively, the user can click a button "Decline" to decline the call without choosing any of the options. Alternatively, the user can click a button "Accept" to accept the call.

Figure 13:
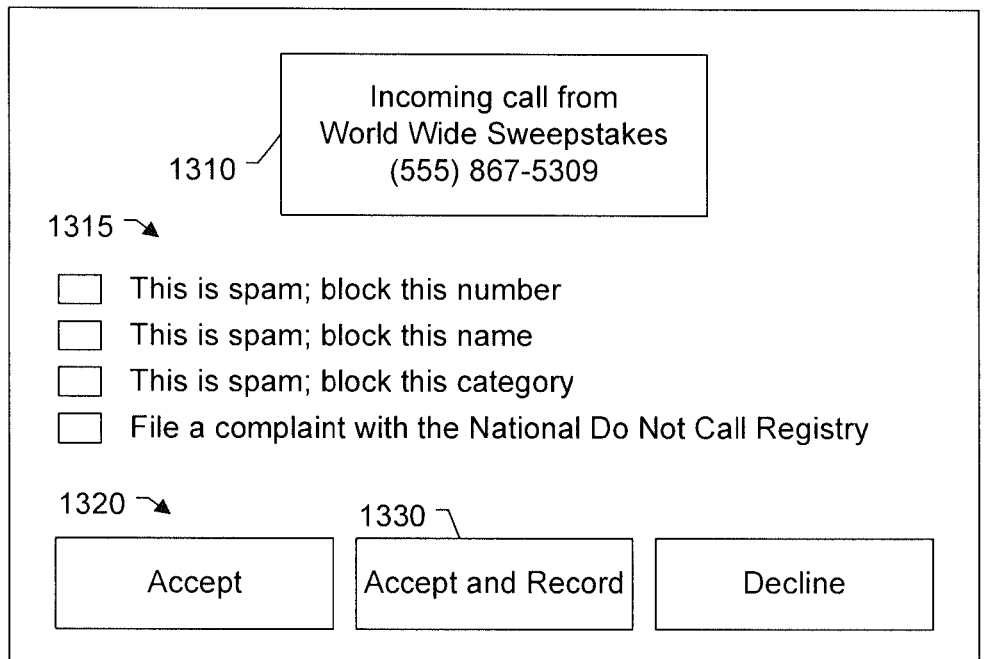
FIG. 13 shows another example of a graphical user interface for blocking the incoming call.

FIG. 13 shows another example of a GUI for categorizing a received call as "spam." A display 1305 includes graphical elements similar to those shown in FIG. 12. For example, an alert 1310 is similar to alert 1210 (FIG. 12). A set of user-selectable options 1315 is similar to user-selectable options 1215. A set of buttons 1320, however, includes a button 1330 to accept and record the call. In this specific implementation, the user can use a single click to accept the call and begin recording the call. The recorded call can be used as evidence when showing a violation of statutes protecting against unsolicited calling. The recorded call can include audio (i.e., the voice on the call) and metadata such as the calling time and date, the caller's number, and the like.

Figure 14:
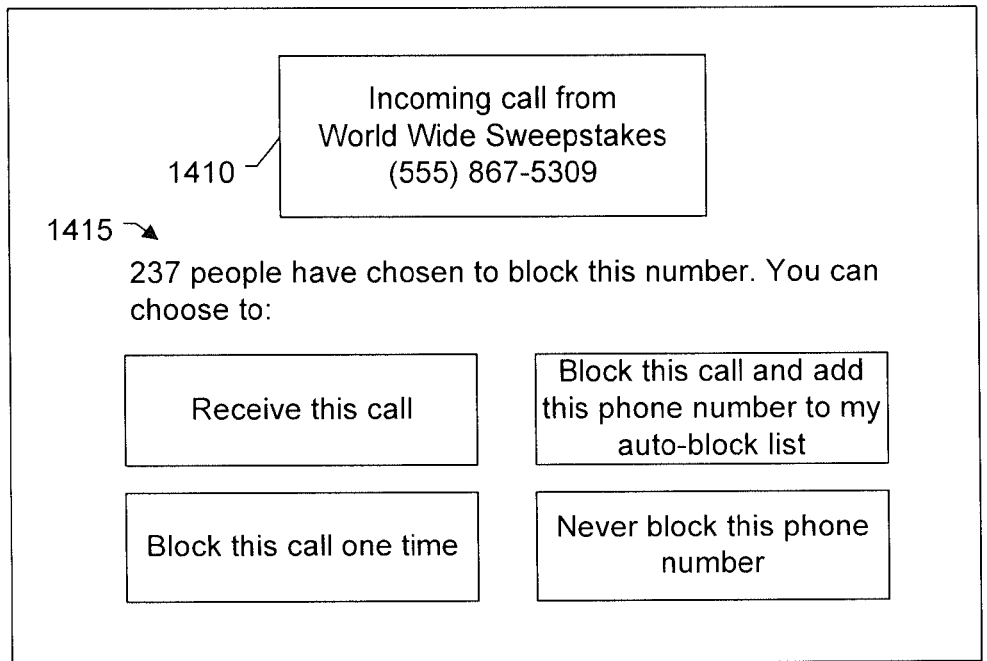
FIG. 14 shows another example of a graphical user interface for blocking the call.

FIG. 14 shows another example of a GUI for call blocking. A display 1405 includes an alert 1410 which is similar to the alert shown in FIGS. 12-13. Display 1405, however, includes a notification 1415 indicating a number of people who have chosen to block this number. In some cases, a user may not be able to determine whether an incoming call is "spam" and should be blocked. Displaying a notification indicating a number of other people who thought the call was "spam" can help the user make the proper decision. Upon reviewing the number of people who have chosen to block the number the user can select a button to receive the call, block the call one time, block the call and add the call to an automatic block list, or never block calls from the number.

Figure 15:
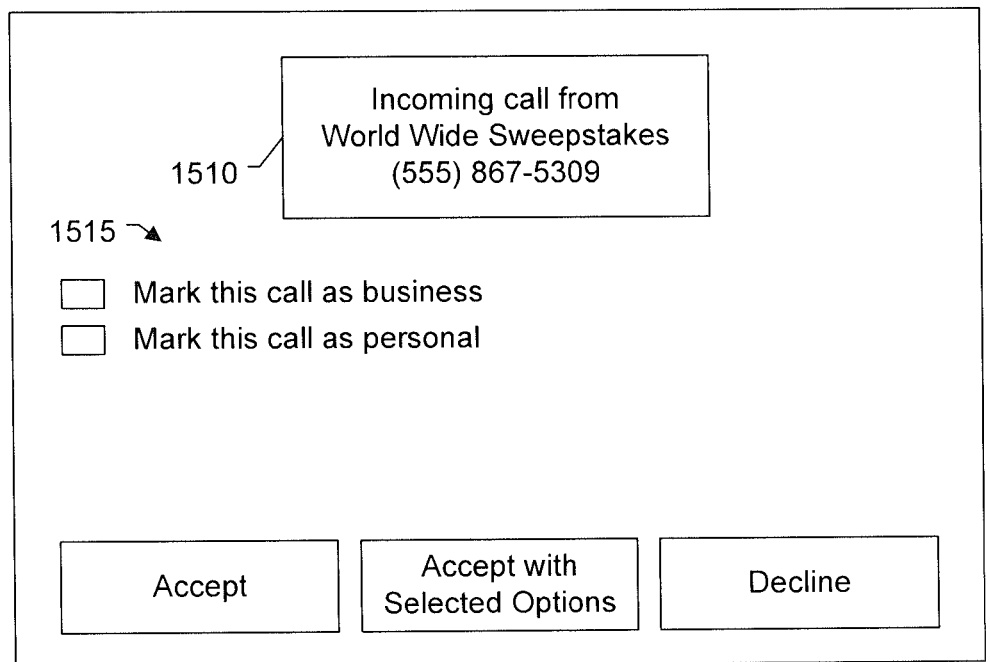
FIG. 15 shows an example of a graphical user interface for categorizing or marking an incoming call.

FIG. 15 shows another example of a GUI for categorizing an incoming call. A display 1505 includes an alert 1510 that is similar to the alert shown in FIGS. 12-14. A set of user-selectable options 1515 allow the user to specify a category for the call. For example, the user can select a first option to mark the call in a business category. The user can select a second option to mark the call in a personal category. It should be appreciated that these options are provided merely as an example. There can be any number of available categories and the categories may be different from what is shown.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:
1. A method comprising:
intercepting, at a mobile communications device, an electronic communication identified by a phone number before the electronic communication is received by an application program on the mobile communications device;

sending the phone number to a server for the server to identify a category associated with the phone number;

receiving the category associated with the phone number from the server;

based on the received category, determining whether the application program should be allowed to receive the electronic communication;

if allowed, forwarding the electronic communication to the application program; and if not allowed, blocking the application program from receiving the electronic communication.

2. The method of claim 1 wherein the electronic communication comprises a voice call.

3. The method of claim 1 wherein the electronic communication comprises a short message service (SMS) message.

4. The method of claim 1 wherein the electronic communication comprises a multimedia message service (MMS) message.

5. The method of claim 1 wherein the step of determining whether the application program should be allowed to receive the electronic communication comprises:

comparing the received category to a list of categories stored on the mobile communications device;

if the list includes the received category, determining that the application program should not be allowed to receive the electronic communication; and if the list does not include the received category, determining that the application program should be allowed to receive the electronic communication.

6. The method of claim 1 wherein the step of determining whether the application program should be allowed to receive the electronic communication comprises:

comparing the received category to a list of categories stored on the mobile communications device;

if the list includes the received category, determining that the application program should be allowed to receive the electronic communication; and if the list does not include the received category, determining that the application program should not be allowed to receive the electronic communication.

7. A method comprising:

intercepting, at a mobile communications device, an electronic communication comprising an identifier before the electronic communication is received by an application program on the mobile communications device;

sending the identifier to a server for the server to provide information associated with the identifier;

receiving the information associated with the identifier from the server;

evaluating at least one rule using the received information to determine whether the application program should be allowed to receive the electronic communication;

if allowed, forwarding the electronic communication to the application program; and if not allowed, blocking the application program from receiving the electronic communication.

8. The method of claim 7 wherein the step of evaluating at least one rule comprises:

evaluating a first rule; and evaluating a second rule, wherein the second rule specifies an exception to the first rule.

9. The method of claim 7 wherein the information associated with the identifier comprises a category and a name, and the step of evaluating at least one rule comprises:

evaluating a first rule; and evaluating a second rule, wherein the first rule specifies that electronic communications associated with the category should be blocked, and the second rule specifies the name as an exception to the first rule.

10. The method of claim 7 wherein the information associated with the identifier comprises a category, and the step of evaluating at least one rule comprises:

evaluating a rule that specifies electronic communications belonging to the category are to be blocked when the electronic communications are received at the mobile communications device while the mobile communications device is in a specific location.

11. The method of claim 7 wherein the information associated with the identifier comprises a category, and the step of evaluating at least one rule comprises:

evaluating a rule that specifies electronic communications belonging to the category are to be blocked when the electronic communications are received at the mobile communications device during a specific time period.

12. The method of claim 7 wherein the information associated with the identifier comprises a category, and the step of evaluating at least one rule comprises:

evaluating a rule that specifies electronic communications belonging to the category are to be blocked when a charge level of a battery of the mobile communications device is below a threshold charge level.

13. The method of claim 7 wherein the information associated with the identifier comprises a category, and the step of evaluating at least one rule comprises:

evaluating a rule that specifies electronic communications belonging to the category are to be blocked when a monthly communications usage total is above a threshold value.

\* \* \* \* \*